US011665297B2

(12) United States Patent
Hiro

(10) Patent No.: US 11,665,297 B2
(45) Date of Patent: May 30, 2023

(54) AUTOMATIC DOCUMENT FEEDER COMPRISING A STORAGE THAT STORES A GUIDE WIDTH PAPER CORRESPONDENCE INFORMATION THAT CONTAINS A TYPE OF PAPER TO CORRESPOND WITH A TOLERANCE OF A WIDTH OF THE DOCUMENT GUIDE AND DOCUMENT LENGTH INFORMATION, AND THE AUTOMATIC DOCUMENT FEEDER DETERMINES IF SKEW OF A DOCUMENT IS ALLOWABLE BEFORE DETERMINING TO DISPLAY A WARNING MESSAGE AND STOP FEEDING A DOCUMENT

(71) Applicant: SHARP KABUSHIKI KAISHA, Sakai (JP)

(72) Inventor: Hideyuki Hiro, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/462,822

(22) Filed: Aug. 31, 2021

(65) Prior Publication Data
US 2022/0086296 A1     Mar. 17, 2022

(30) Foreign Application Priority Data
Sep. 15, 2020  (JP) .............................. JP2020-154688

(51) Int. Cl.
*G06K 15/16*  (2006.01)
*H04N 1/00*  (2006.01)

(52) U.S. Cl.
CPC ....... *H04N 1/00718* (2013.01); *H04N 1/0071* (2013.01); *H04N 1/00615* (2013.01); (Continued)

(58) Field of Classification Search
CPC .......... H04N 1/00615; H04N 1/00689; H04N 1/00702; H04N 1/0071; H04N 1/00713; (Continued)

(56) References Cited

U.S. PATENT DOCUMENTS

| 2012/0307278 A1* | 12/2012 | Takahashi | H04N 1/00771 358/1.13 |
| 2017/0001821 A1* | 1/2017 | Sato | G06T 7/60 |
| 2018/0179006 A1* | 6/2018 | Kogi | H04N 1/00477 |

FOREIGN PATENT DOCUMENTS

| JP | 2013031079 A | * | 2/2013 |
| JP | 2013031079 A | | 2/2013 |

(Continued)

*Primary Examiner* — Chad Dickerson
(74) *Attorney, Agent, or Firm* — ScienBiziP, P.C.

(57) ABSTRACT

An automatic document feeder includes a document loading detector, a document feeder, a document guide, a guide width measurer, a document width acquirer, a guide shift determiner, a document skew detector, a skew determiner, a warning display information generator, and a display. When a detected skew of a document is determined to be unallowable, the document feeder stops a feeding of the document. The warning display information generator generates a warning content about a feed trouble that stopped the feeding of the document, and the generated warning content about the feed trouble is displayed on the display.

7 Claims, 21 Drawing Sheets

(52) U.S. Cl.
CPC ..... *H04N 1/00689* (2013.01); *H04N 1/00702* (2013.01); *H04N 1/00713* (2013.01); *H04N 1/00724* (2013.01); *H04N 1/00771* (2013.01)

(58) Field of Classification Search
CPC ........... H04N 1/00718; H04N 1/00724; H04N 1/00771
USPC .............................................. 358/1.11–1.18
See application file for complete search history.

(56) References Cited

FOREIGN PATENT DOCUMENTS

| | | | | |
|---|---|---|---|---|
| JP | 2016088693 | A | * | 5/2016 |
| JP | 2019101270 | A | * | 6/2019 |
| JP | 2019201242 | A | * | 11/2019 |

* cited by examiner

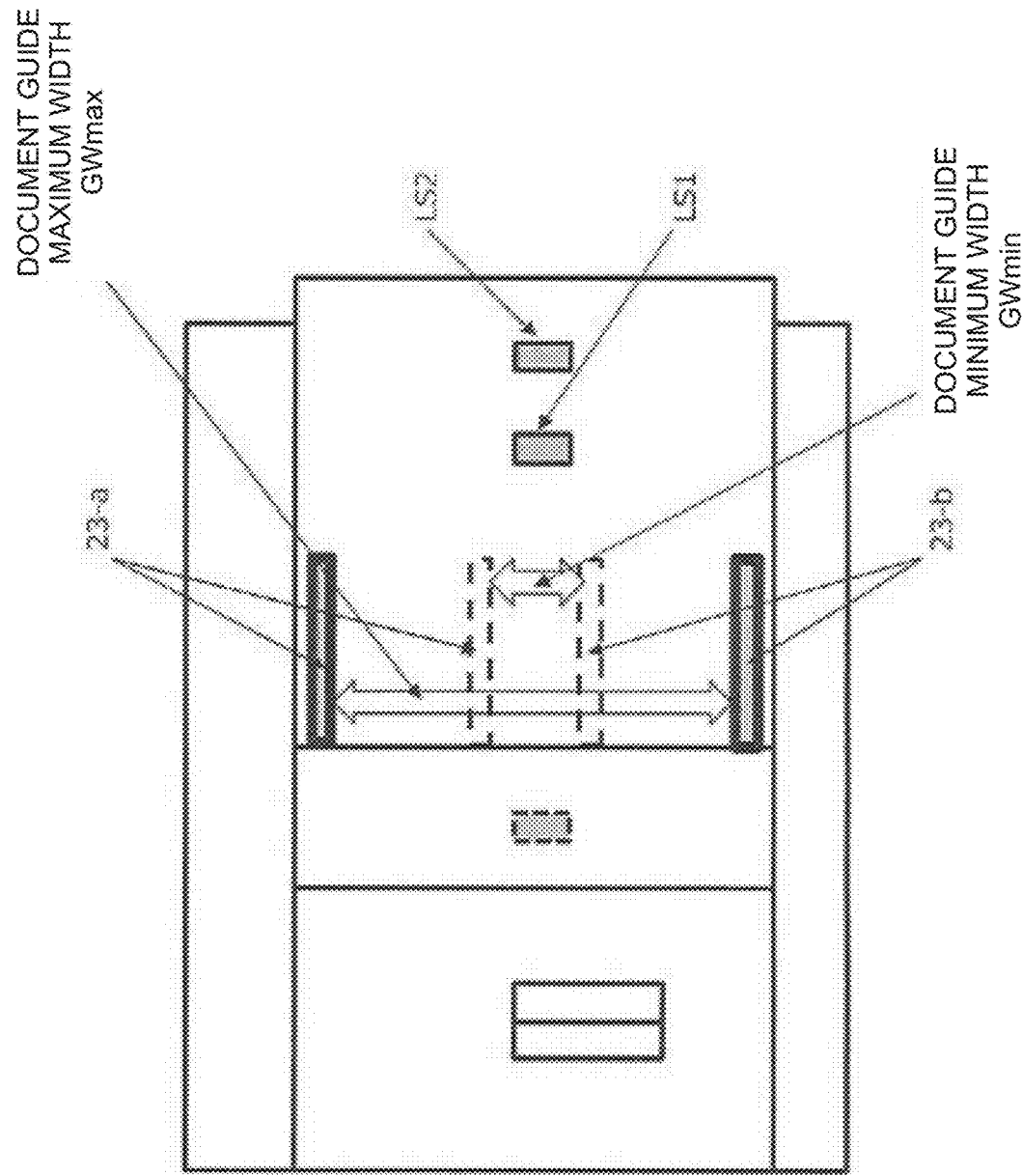

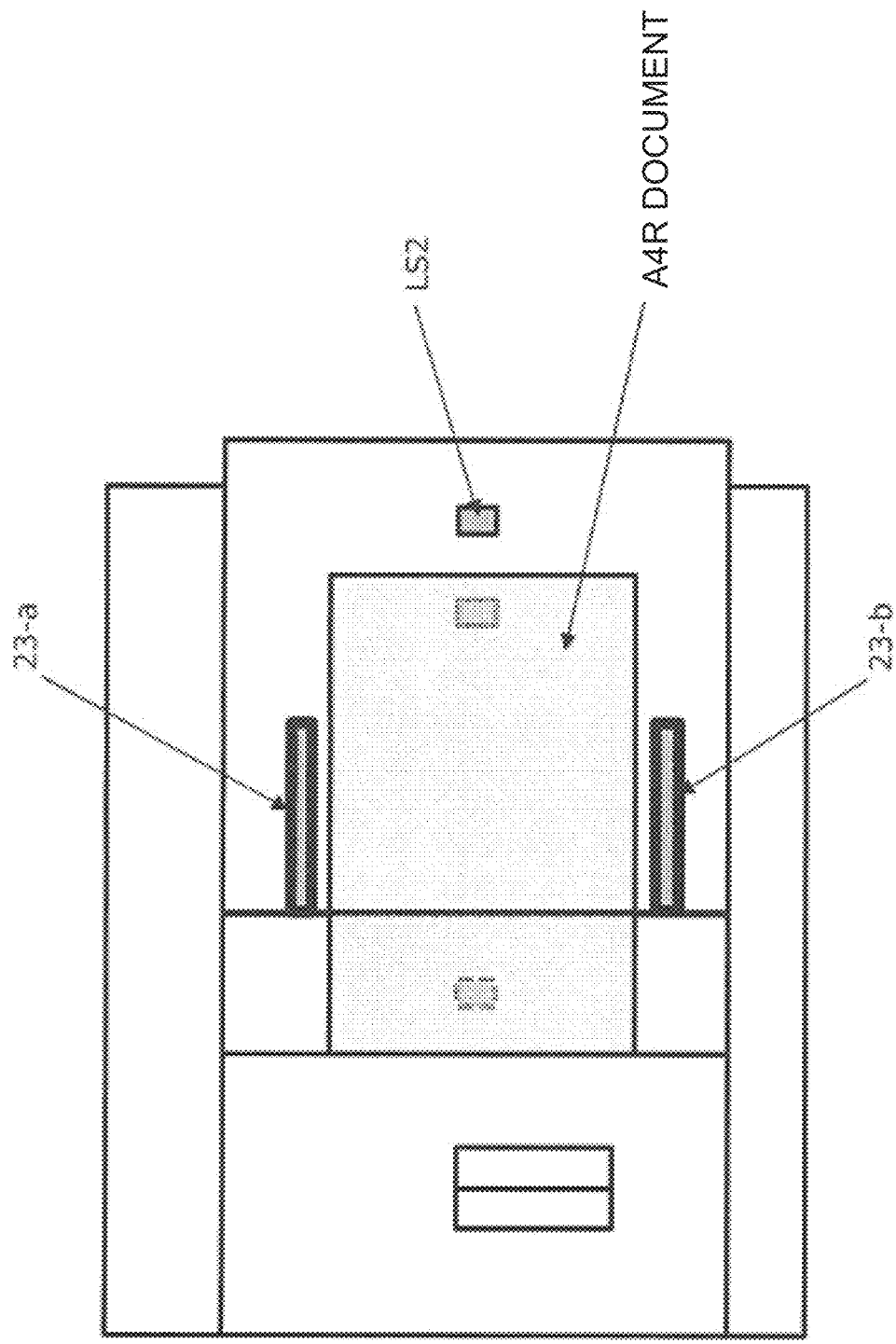

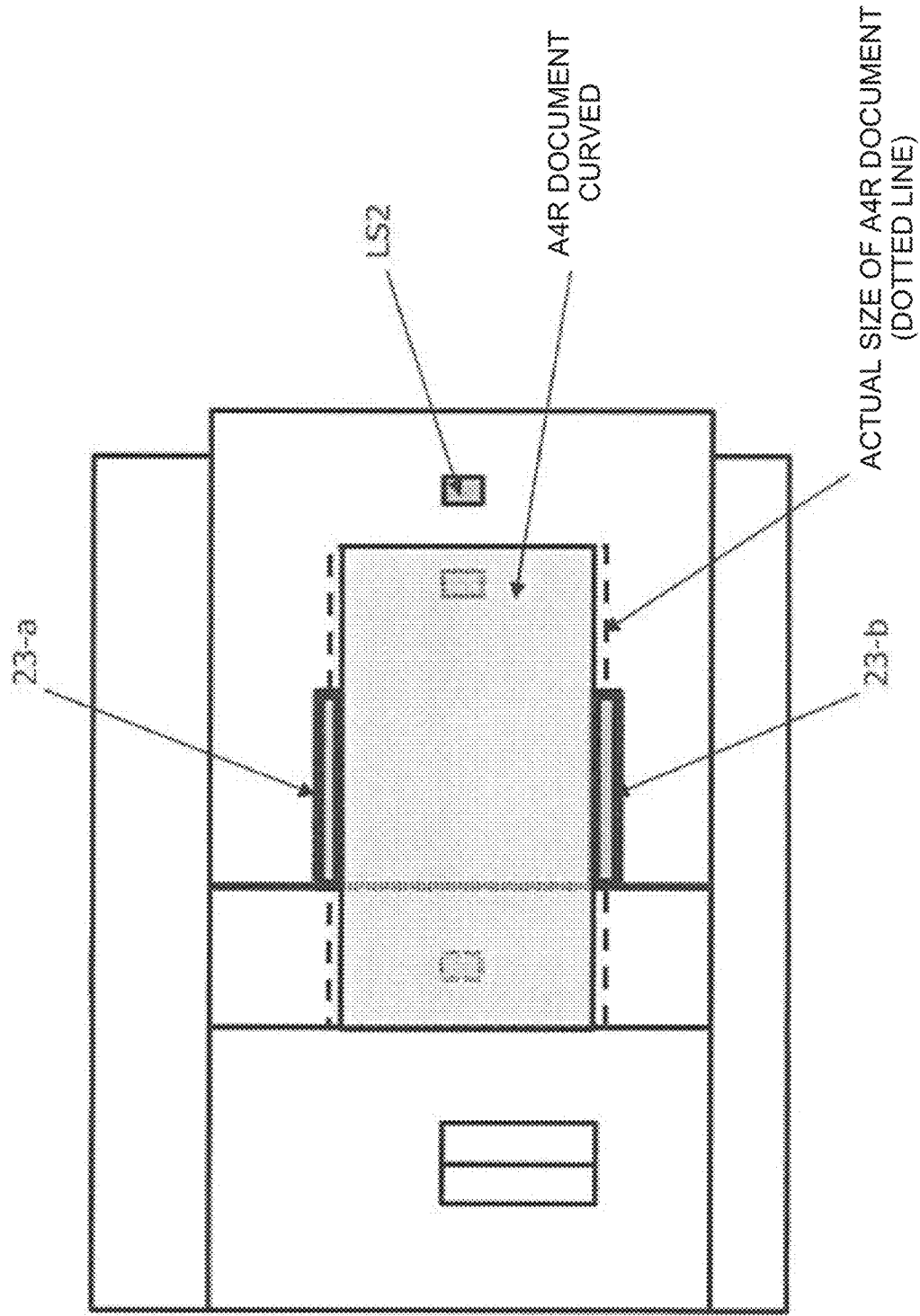

FIG. 11

DOCUMENT GUIDE DEFAULT INFORMATION

| | G1<br>DEFAULT PAPER SIZE | G2<br>DEFAULT GUIDE WIDTH | G3<br>DEFAULT INPUT VALUE |
|---|---|---|---|
| 1 | MAXIMUM SIZE | 303.0mm | 45 |
| 2 | A4R | 210.0mm | 380 |
| 3 | A5R | 148.0mm | 619 |
| 4 | MINIMUM SIZE | 48.8mm | 975 |

FIG. 12

GUIDE WIDTH PAPER CORRESPONDENCE INFORMATION

| | DOCUMENT LENGTH SENSOR LS1 | OFF | ON | ON |
|---|---|---|---|---|
| | DOCUMENT LENGTH SENSOR LS2 | OFF | OFF | ON |
| 1 | 288.0 OR MORE | A4 | A3 | A3 |
| 2 | 287.9–268.0 | LETTER (8.5 x 11) | LEDGER (11 x 17) | LEDGER (11 x 17) |
| 3 | 267.9–236.0 | B5 | B4 | B4 |
| 4 | 235.9–196.0 | A5 | A4R | LEGAL (8.5 x 14) |
| 5 | 195.9 OR LESS | B5R | B5R | LEGAL (8.5 x 14) |

GUIDE WIDTH TOLERANCE

FIG. 13

STANDARD PAPER SIZE INFORMATION

| STANDARD PAPER | WIDTH (mm) | LENGTH (mm) |
|---|---|---|
| A3 | 297.0 | 420.0 |
| A4 | 297.0 | 210.0 |
| A5 | 210.0 | 148.0 |
| B4 | 257.0 | 364.0 |
| B5 | 257.0 | 182.0 |
| A4R | 210.0 | 297.0 |
| A5R | 148.0 | 210.0 |
| B5R | 182.0 | 257.0 |

FIG. 14

| DOCUMENT GUIDE DETECTION INFORMATION Ga | 350 |
|---|---|

DOCUMENT GUIDE DEFAULT INFORMATION

| | G1 | G2 | G3 |
|---|---|---|---|
| | DEFAULT PAPER SIZE | DEFAULT GUIDE WIDTH | DEFAULT INPUT VALUE |
| 1 | MAXIMUM SIZE | 303.0mm  G20 | 45  G30 |
| 2 | A4R | 210.0mm  G21 | 380  G31 |

WHEN G30 < Ga < G31
EXAMPLE OF CALCULATING
GUIDE WIDTH CALCULATION
INFORMATION GW $$\text{GUIDE WIDTH CALCULATION INFORMATION GW} = G21 + \frac{Ga - G31}{G30 - G31} \times (G20 - G21)$$

$$\text{GUIDE WIDTH CALCULATION INFORMATION GW} = 210 + \frac{350 - 380}{45 - 380} \times (303 - 210)$$

$$GW = 210 + \frac{30}{335} \times 93$$

$$GW = 210 + 8.32$$

$$GW = 218.32 \text{ (mm)}$$

LOADED DOCUMENT PAPER: WIDTH OF A4R = 210 (mm)

CALCULATED WIDTH BETWEEN DOCUMENT GUIDES (GW = 218.32 mm) IS ABOUT 8 mm WIDER THAN WIDTH OF LOADED DOCUMENT PAPER A4R (210 mm).

FIG. 17

```
DOCUMENT FEEDING ERROR WARNING DISPLAY

SKEWED FEEDING OF DOCUMENT IS DETECTED
OPEN DOCUMENT FEED COVER, AND REMOVE PAPER
```

FIG. 18

```
DOCUMENT FEEDING ERROR WARNING DISPLAY

SKEWED FEEDING OF DOCUMENT IS DETECTED
OPEN DOCUMENT FEED COVER, AND REMOVE PAPER

IT IS LIKELY THAT DOCUMENT GUIDE IS SHIFTED,
OR DOCUMENT IS BENT OR NOT ALIGNED.
```

FIG. 19

DOCUMENT FEEDING ERROR WARNING DISPLAY

SKEWED FEEDING OF DOCUMENT IS DETECTED
OPEN DOCUMENT FEED COVER, AND REMOVE PAPER

DOCUMENT GUIDE IS WIDER THAN DETECTED
DOCUMENT SIZE
(PROPERLY ADJUST DOCUMENT GUIDE TO
DOCUMENT WIDTH)

FIG. 20

DOCUMENT FEEDING ERROR WARNING DISPLAY

SKEWED FEEDING OF DOCUMENT IS DETECTED
OPEN DOCUMENT FEED COVER, AND REMOVE PAPER

DOCUMENT GUIDE IS NARROWER THAN DETECTED
DOCUMENT SIZE
(PROPERLY ADJUST DOCUMENT GUIDE TO
DOCUMENT WIDTH)

FIG. 21

DOCUMENT FEEDING ERROR WARNING DISPLAY

SKEWED FEEDING OF DOCUMENT IS DETECTED
OPEN DOCUMENT FEED COVER, AND REMOVE PAPER

DOCUMENT GUIDE IS WIDER THAN DETECTED
DOCUMENT SIZE

PROPERLY ADJUST DOCUMENT GUIDE TO
DOCUMENT WIDTH
DETECTED DOCUMENT: A4R (WIDTH: 210 mm)
DOCUMENT GUIDE WIDTH: 220 mm

FIG. 22

DOCUMENT FEEDING ERROR WARNING DISPLAY

SKEWED FEEDING OF DOCUMENT IS DETECTED
OPEN DOCUMENT FEED COVER, AND REMOVE PAPER

DOCUMENT GUIDE IS NARROWER THAN DETECTED
DOCUMENT SIZE

PROPERLY ADJUST DOCUMENT GUIDE TO
DOCUMENT WIDTH
DETECTED DOCUMENT: A4R (WIDTH: 210 mm)
DOCUMENT GUIDE WIDTH: 220 mm

AUTOMATIC DOCUMENT FEEDER COMPRISING A STORAGE THAT STORES A GUIDE WIDTH PAPER CORRESPONDENCE INFORMATION THAT CONTAINS A TYPE OF PAPER TO CORRESPOND WITH A TOLERANCE OF A WIDTH OF THE DOCUMENT GUIDE AND DOCUMENT LENGTH INFORMATION, AND THE AUTOMATIC DOCUMENT FEEDER DETERMINES IF SKEW OF A DOCUMENT IS ALLOWABLE BEFORE DETERMINING TO DISPLAY A WARNING MESSAGE AND STOP FEEDING A DOCUMENT

CROSS-REFERENCE TO RELATED APPLICATION

The present application claims priority from Japanese Patent Application Number 2020-154688, the content to which is hereby incorporated by reference into this application.

BACKGROUND OF THE INVENTION

1. Field of the Invention

One aspect of the present invention relates to an automatic document feeder, and in particular to an automatic document feeder having a function of sequentially feeding documents, which are loaded along a pair of document guides, one by one in the direction of a reader to read an image described on the document.

DESCRIPTION OF THE BACKGROUND ART

Conventionally, an automatic document feeder loads a plurality of documents on a document loading table and sequentially feeds the documents one by one in the direction of a certain reading site of a reader. After the image of the document is read by the reader, the read document is discharged in the direction of a paper discharge table.
In order to align the documents loaded on the document loading table, the document loading table is provided with a pair of document guides.
Normally, the user sets the position of the pair of document guides so that the width of the pair of document guides substantially matches the width of the to-be-read document.
However, if the width of the set pair of document guides does not match the width of the to-be-read document, for example, if the width of the document guide is wider than the width of the to-be-read document, the to-be-read document may be fed in a skewed manner.
When the to-be-read document is fed in the skewed manner, if a reading process is performed with the document slightly skewed, a skewed image may be read.
If the document is skewed too much, the document may collide with a feed member such as a roller, and the feeding may be stopped or the document may be bent.
Then, in order to prevent the document from being fed bent or prevent the skewed image from being read, a device having a function to detect a skewed feeding of the document is used.
Also, Japanese Unexamined Patent Application Publication No. 2013-31079 describes an image reader that detects, from a tip end of a fed document, a document skew of a document, calculates, from the document width and the document skew, a main scanning width, which is a width at which the document is fed in an orthogonal direction orthogonal to a feed direction of the document, makes a notification to temporarily stop the reading of the document and to widen the document guide when the main scanning width exceeds a predetermined first threshold value, and thereafter resumes the feeding of the document when it is checked that the width of the document guide has been widened by a user more than the main scanning width.

SUMMARY OF THE INVENTION

However, in a device having a function to detect a skewed feeding of a document, even if the device is able to stop feeding of the document when detecting the skewed feeding, the cause for stop of the feeding may be unknown.
For example, even if the cause for stop of feeding is that the width of the document guide does not match the width of the to-be-read document, when the user does not notice the shift of the document guide and restarts the reading by returning the document to a predetermined position on the document loading table without changing the position of the document guide, the to-be-read document may be fed in a skewed manner as before, resulting in repeated feeding and reading troubles such as stop of the feeding.
In the device of Japanese Unexamined Patent Application Publication No. 2013-31079, the user can expand the document guide thereby to resume the feeding of the document, but if the to-be-fed document is skewed significantly, even if the document no longer hits the document guide, the document may still collide with a feeding member arranged in the subsequent feed path, and the document may be bent, resulting in damage to the document.
Therefore, the one aspect of the present invention has been made in view of the above circumstances. It is an object of the present invention to notify, when stop of feeding a to-be-read document is attributable to a skew shift of the fed to-be-read document, a user of measures to remove a cause for stop if the cause for stop can be specified.
In particular, when the cause of the stop of feeding of the document is the document guide, an appropriate warning display is provided to the user thereby to accurately notify the user of the measures to take for the document guide.
It is also an object to provide an automatic document feeder capable of suppressing a document reading error, by displaying a warning including a cause for stop, and thereby reducing, when the document reading is resumed, repeated stops of feeding of the document and repeated damages given to the document.
One aspect of the present invention provides an automatic document feeder, including: a document loading detector that detects that a document is loaded on a document loading table; a document feeder that feeds, to a predetermined feed path, the document loaded on the document loading table; a document guide that includes two guide members for aligning the document from a direction orthogonal to a feed direction of the document loaded on the document loading table; a guide width measurer that, after the document is loaded on the document loading table and positions of the two guide members are set, measures a width of the document guide and calculates the width as guide width calculation information; a document width acquirer that acquires a document width of the loaded document when the document is loaded on the document loading table; a guide shift determiner that determines whether or not the calculated guide width calculation information and the acquired document width are different from each other to such an extent that the difference may cause a feed trouble when the loaded document is fed; a document skew detector that detects a skew of the document fed in the feed path; a skew determiner that determines whether or not the detected skew of the document is allowable or not; a warning display information generator that generates a warning content about the feed trouble when the feed trouble occurs; and a display that displays the generated warning content, wherein when the detected skew of the document is determined to be unallowable, the document feeder stops the feeding of the document, the warning display information generator generates the warning content about the feed trouble that stopped the feeding of the document, and the generated warning content about the feed trouble is displayed on the display.

Further, when the feeding of the document is stopped, when the guide shift determiner determines that the calculated width of the document guide and the acquired document width of the document are different from each other by a predetermined determination value or more, the warning display information generator displays, on the display, a warning display including that a setting of the document guide is different from the document width.

Further, the automatic document feeder further includes: a storage that stores a guide width paper correspondence information, and a document length detector that detects a length of the loaded document in the feed direction, and outputs document length information that corresponds to the length of the document in the feed direction, wherein in the guide width paper correspondence information, a type of document paper is preliminarily stored, in a manner to correspond to a tolerance of the width of the document guide to which the guide width calculation information belongs and correspond to the document length information, the document width acquirer uses the document width paper correspondence information to specify the tolerance of the width of the document guide to which the calculated guide width calculation information belongs, determines the type of the document paper that corresponds to the specified tolerance of the width of the document guide and correspond to the document length information output by the document length detector, and acquires, as the document width of the loaded document, the document width preliminarily set for the determined type of the document paper.

Further, the document skew detector includes a plurality of skew sensors arranged at a predetermined interval in the direction perpendicular to feed direction of the document in a middle of the feed path of the document, and each of the skew sensors outputs a detection signal showing that the document is detected when a tip end of the document reaches a position of the skew sensor.

Further, the skew determiner calculates, as skew shift amount information, a time difference of the detection signals output from the respective skew sensors, and determines, when the skew shift amount information is equal to or larger than a predetermined determination threshold value, that the fed document has an unallowable skew.

Further, the document length detector includes a plurality of document length sensors which are, in the document loading table, arranged at a position separated by a predetermined distance along the feed direction of the document.

Further, the automatic document feeder further includes a guide shift amount calculator that calculates, as a document guide shift amount, a difference between the calculated guide width calculation information and the acquired width of the loaded document, wherein the storage preliminarily stores a document guide shift amount determination value that is a standard value for determining the document guide shift amount, and when the calculated document guide shift amount is larger than the document guide shift amount determination value, the guide shift determiner determines that the loaded document may cause the feed trouble.

Further, one aspect of the present invention provides a method for detecting a shift of a document guide of an automatic document feeder, the method including: detecting, after a document is loaded on a document loading table, and a position of the document guide including two guide members for aligning the document from a direction orthogonal to a feed direction of the document loaded on the document loading table is set, that the document is loaded on the document loading table; measuring a width of the document guide and calculating the width as guide width calculation information; acquiring a document width of the document loaded on the document loading table; determining whether or not the calculated guide width calculation information and the acquired document width are different from each other to such an extent that the difference may cause a feed trouble when the loaded document is fed; detecting a skew of the document, which is fed in the feed path, after the document loaded on the document loading table is, for reading of the document, started to be fed to a predetermined feed path; determining whether or not the detected skew of the document is allowable or not; stopping the feeding of the document when the detected skew of the document is determined to be unallowable; generating a warning content about the feed trouble that stopped the feeding of the document; and displaying the generated warning content about the feed trouble, wherein when it is determined that the calculated width of the document guide and the acquired document width of the document are different from each other by a predetermined determination value or more, the displayed warning content includes that a setting of the document guide is different from the document width.

According to one aspect of the present invention, when it is determined that the detected skew of the document is not allowable, the document is stopped from being fed, and the warning content about the feed trouble that caused the document to be stopped are generated and displayed, so that the user can easily remove the cause of the stop of the document from being fed by checking the warning display. When the reading of the document is resumed, the user can reduce the number of feed troubles such as repeated stops of the feeding of the document and repeated damages given to the document, and further reduce the number of document reading troubles.

In addition, when the document feeding is stopped, and the guide shift determiner determines that the calculated width of the document guide and the acquired width of the document are different from each other by the predetermined determination value or more, the warning display including the fact that the setting of the document guide is different from the width of the document is displayed on the display. If the cause for stopping the feeding of document is the document guide, the user can easily reconfigure, by checking the warning display, the document guide that caused the document stop, which ensures that the cause for stopping the feeding of document is removed. When the reading of the document is resumed, it is possible to reduce the feed troubles such as repeated stops of the document and repeated damages given to the document and to reduce the reading trouble of the document.

BRIEF DESCRIPTION OF THE DRAWINGS

FIG. 8A An illustration of an example of an adjustment position and document guide width about a document guide of the present invention.

FIG. 9A An illustration of an example of a document loading state seen when the guide width of the document guide of the present invention is wider than the width of the loaded document.

FIG. 10A An illustration of an example of a document loading state seen when the guide width of the document guide of the present invention is narrower than the width of the loaded document.

FIG. 11 An illustration of an example of document guide default information of the present invention.

FIG. 12 An illustration of an example of guide width paper correspondence information of the present invention.

FIG. 13 An illustration of an example of the size of standard paper used for a to-be-read document of the present invention.

FIG. 14 An illustration of an example of a method of calculating guide width calculation information of the present invention.

FIG. 17 An illustration of an example of a document feeding error warning display displayed on a display of the present invention.

FIG. 18 An illustration of an example of the document feeding error warning display including the cause of the document feed error, in the present invention.

FIG. 19 An illustration of an example of the document feeding error warning display including the cause of the document feed error, in the present invention.

FIG. 20 An illustration of an example of the document feeding error warning display including the cause of the document feed error, in the present invention.

FIG. 21 An illustration of an example of the document feeding error warning display including the cause of the document feed error, in the present invention.

FIG. 22 An illustration of an example of the document feeding error warning display including the cause of the document feed error, in the present invention.

DESCRIPTION OF THE PREFERRED EMBODIMENTS

An embodiment of one aspect of the present invention is described below using the figures. Note that the present invention is not limited to the description of the examples below.

One aspect of the present invention is an automatic document feeder having a function of loading one document or a plurality of documents on a document loading table, and sequentially feeding the documents one by one in the direction of a reading site thereby to continuously read images of a plurality of documents.

However, the one aspect of the present invention can also be applied to an image forming device provided with the automatic document feeder, any other information processing device and image processing device having a function to sequentially read a plurality of documents loaded on the document loading table, and the like.

Further, the automatic document feeder (ADF) may be a device that reads only one side of the document or both sides of the document.

Configuration of Automatic Document Feeder

Figure 1:
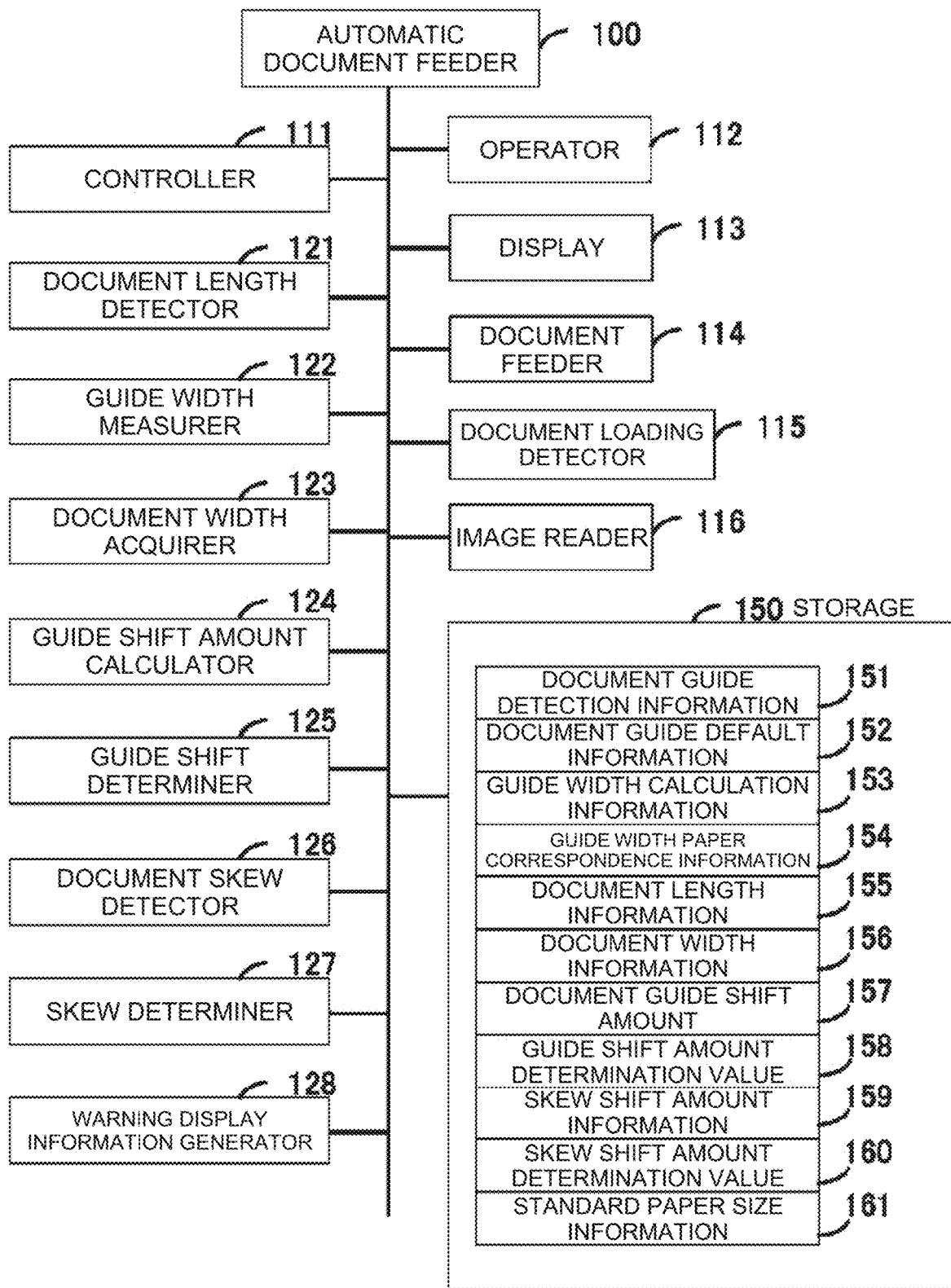
FIG. 1 A block diagram of an example of an automatic document feeder of the present invention.

FIG. 1 shows a block diagram of an example of an automatic document feeder of the present invention.

Figure 2:
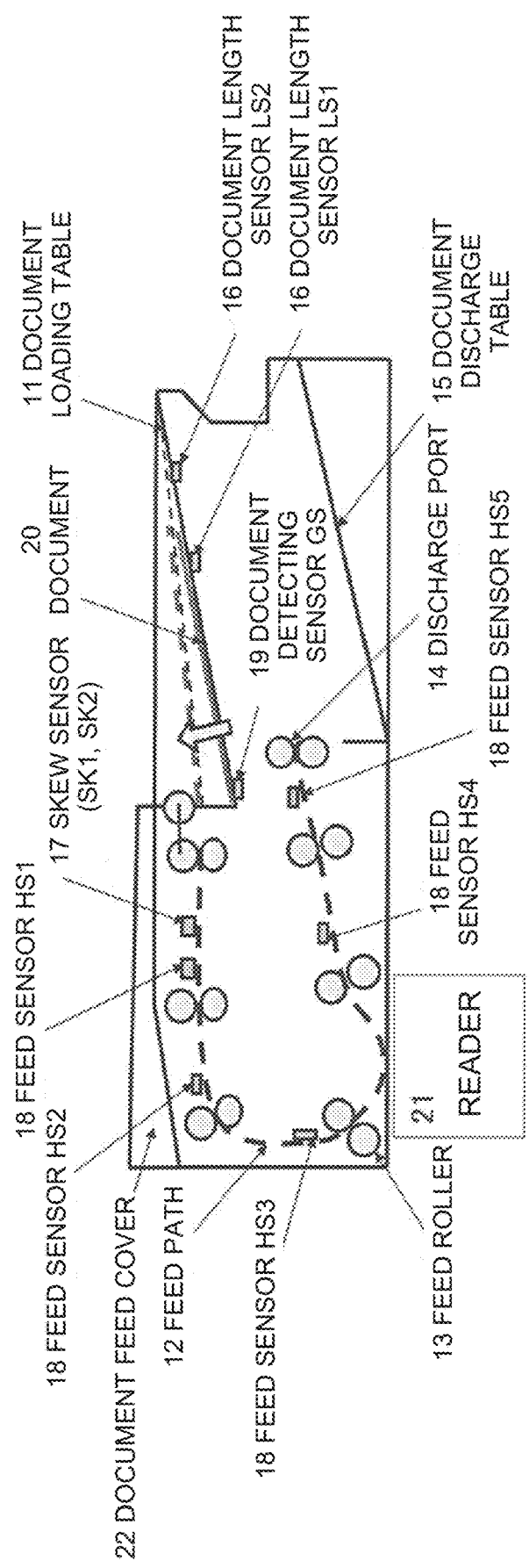
FIG. 2 An illustration of an example of a document feed path, with the automatic document feeder of the present invention viewed from a side direction.

FIG. 2 shows an illustration of an example of a document feed path, with the automatic document feeder of the present invention viewed from a side direction.

Figure 3:
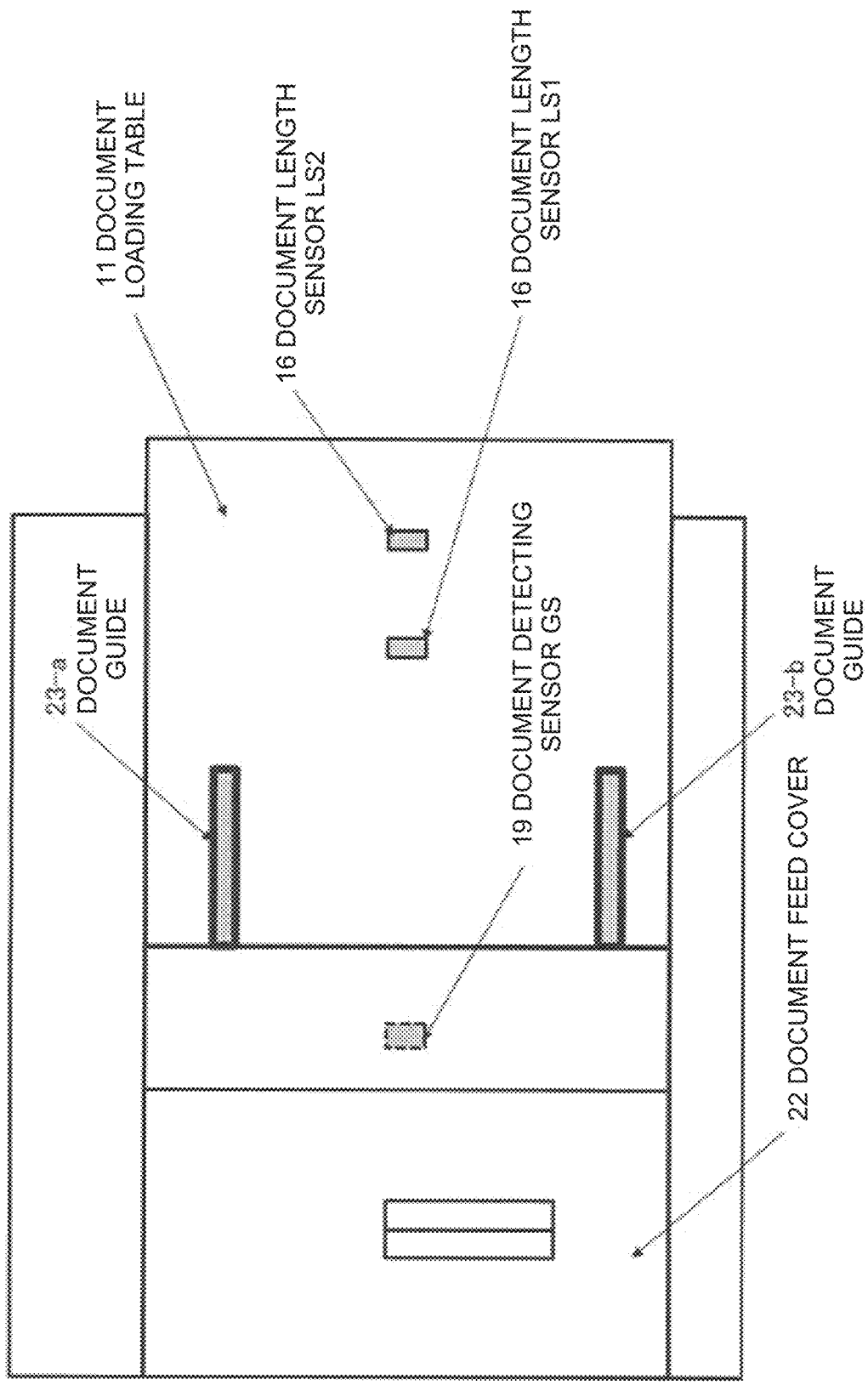
FIG. 3 An illustration of an example of an arrangement of a document loading table and the like, with the automatic document feeder of the present invention viewed from above.

FIG. 3 shows an illustration of an example of an arrangement of a document loading table and the like, with the automatic document feeder of the present invention viewed from above.

An automatic document feeder 100 of the one aspect of the present invention mainly includes a document loading table 11 on which a to-be-read document is arranged, a plurality of feed rollers 13 for feeding the document, a feed path 12 for sequentially feeding a plurality of to-be-read documents to a certain reading site of a reader 21, a document feed cover 22 for covering the feed path 12 and the like from above, a document discharge table 15 for storing the discharged document, and a discharge port 14 for discharging the document in the direction of the document discharge table 15.

In the positions shown in FIGS. 2 and 3, the document loading table 11 is provided with a document detection sensor (GS) 19 that detects whether the document is loaded, a document length sensor (LS1, LS2) 16 that detects the length of the document loaded on the table, and a document guide 23.

The document guide 23 includes two guide members (23-*a*, 23-*b*), and as shown in FIG. 3, is a member for aligning the documents by pressing the documents from a direction orthogonal to a feed direction of the documents loaded on the document loading table 11. In the case of a plurality of loaded documents, end portions of a plurality of documents loaded on the document loading table on top of each other are aligned.

The two guide members (23-*a*, 23-*b*) are members elongated in the feed direction of the document and are arranged so as to be movable in the direction orthogonal to the feed direction.

After a user loads the document on the document loading table 11, the user moves the two guide members (23-*a*, 23-*b*) and adjusts the positions of the two document guides so that the distance between the two guide members is substantially the same as the length of the loaded document in the direction orthogonal to the feed direction.

The distance between the two guide members is referred to as a width of the document guide or a guide width.

The length of the loaded document in the direction orthogonal to the feed direction is called a width of the document or a document width.

Figure 4:
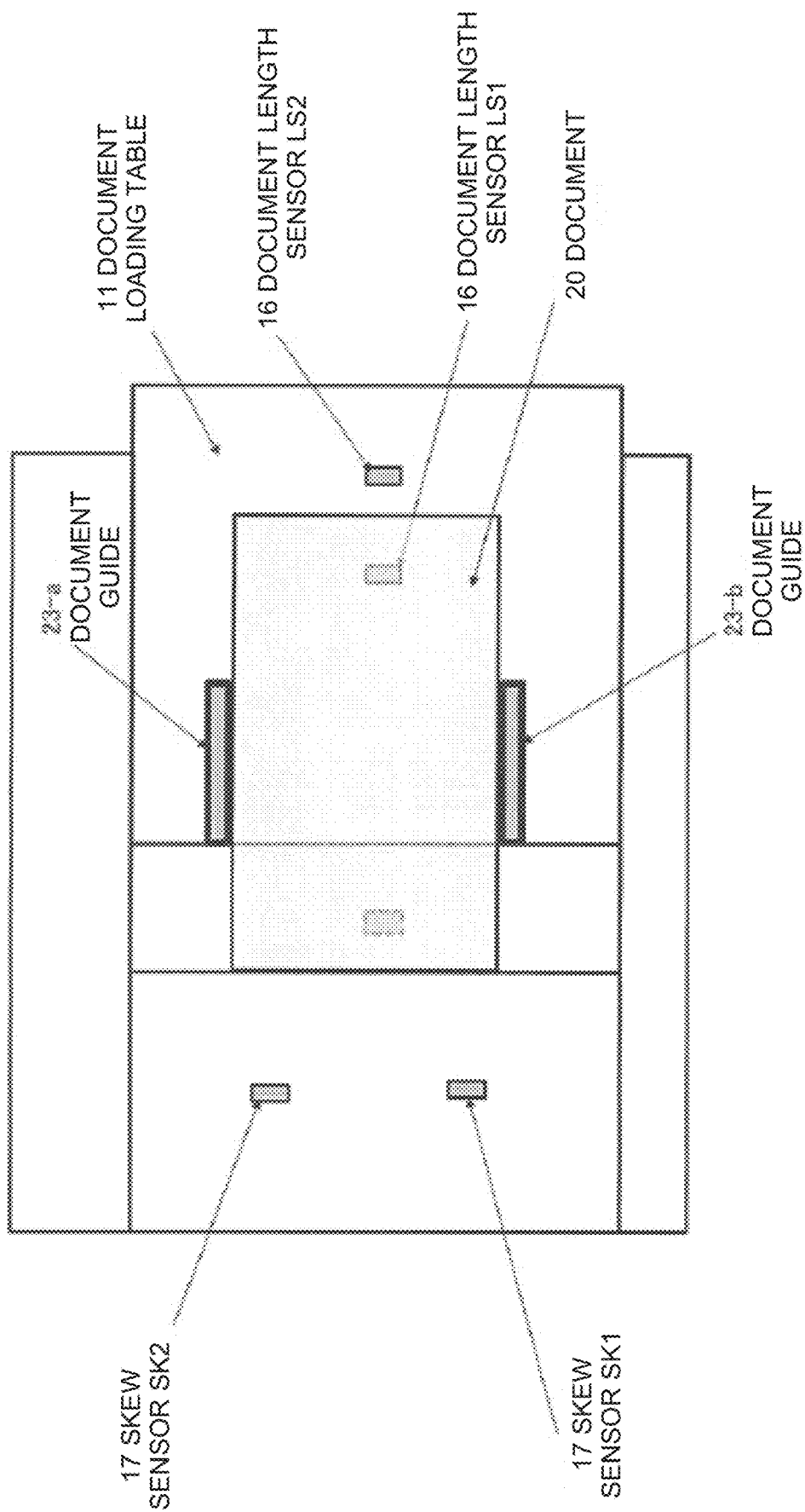
FIG. 4 An illustration of an example of a state where a document is loaded on the document loading table of the present invention.

Further, the feed path 12 is provided with a plurality of feed sensors (HS1 to HS5) 18 for detecting the passage of the fed document and a plurality of skew sensors (SK1, SK2) 17 for detecting the skew of the fed document, at positions as shown in FIG. 2 and to-be-shown FIG. 4.

The document loading table 11 is a table on which one document 10 or a plurality of documents 20 are loaded, and when a plurality of documents are to be read in succession, the plurality of documents 20 are loaded on top of each other.

The feed path 12 is a path through which the documents 20 loaded on the document loading table 11 are fed one by one, and through which the document passes from the document loading table 11 to the document discharge table 15.

A plurality of feed rollers 13 are members that move the document, and are arranged along the feed path 12 of the document.

The document loaded on the document loading table 11 is taken out one by one by the feed roller 13, is passed through the feed path 12, and is discharged from the discharge port 14.

When being fed in succession, a plurality of documents are drawn into the feed path 12 with a certain distance opened between the document that has been taken out and the next document to be taken out.

The rotation of each of the feed rollers 13 is controlled according to the speed of the fed document and the size of the document.

The reading site is arranged in the feed path 12 near where the reader 21 of the document is arranged.

The reader 21 includes a light source, a mirror, a solid-state image element, and the like, and is a device for reading an image on the surface of the document that comes to the reading site, and corresponds to an image reader 116 of FIG. 1.

The discharge port 14 is an opening through which the document that has been fed along the feed path 12 is discharged in the direction of the document discharge table 15.

The document discharge table 15 is a table for storing the document discharged from the discharge port 14, and in the case of a plurality of documents that have been read, the plurality of documents are stacked and stored.

The document length sensor 16 is a sensor for detecting, among lengths of the documents loaded on the document loading table, the length of the document in the feed direction, and corresponds to a document length detector 121 in FIG. 1.

A plurality of document length sensors 16 are provided so as to distinguish among a plurality of documents with different lengths, and, in the document loading table, along the feed direction of the document, are fixedly arranged at a position separated by a predetermined distance.

As shown in FIGS. 2 and 3, for example, the document length sensor (LS1, LS2) 16 includes two sensors and are arranged, along the feed direction of the document, at a predetermined distance apart.

As the document length sensor 16, for example, a photodetector having a light emitting portion and a light receiving portion is used, and when the light emitted from the light emitting portion and reflected to the document is detected by the light receiving portion, it is detected that the document is loaded above the sensor.

The length of the loaded document in the feed direction is detected by the presence or absence of light detection by the light receiving portion of each of the two sensors (LS1 and LS2).

In FIG. 3, it is assumed that a first document length sensor LS1 is arranged on the left of the second document length sensor LS2 and in a position close to an entrance of the feed path 12.

FIG. 4 shows an illustration of an example of a state where the document 20 is loaded on the document loading table 11.

FIG. 4 shows a case where the loaded document 20 is above the first document length sensor LS1, but not above the second document length sensor LS2.

In this case, the first document length sensor LS1 is in the on-state to detect light, and the second document length sensor LS2 is in the off-state not to detect light.

That is, light is detected by the light receiving portion of the first document length sensor LS1, but light is not detected by the light receiving portion of the second document length sensor LS2, thereby showing that the loaded document is relatively short in the feed direction to the extent that the loaded document does not cover the upper part of the second document length sensor LS2.

On the other hand, when both of the two document length sensors (LS1 and LS2) are in the on-state to detect light, it shows that the loaded document is relatively long in the feed direction to the extent that the loaded document covers the upper part of the second document length sensor LS2 in addition to the first document length sensor LS1.

If both of the two document length sensors (LS1 and LS2) are in the off-state with no light detected, the loaded document is fairly short in the feed direction. The on-state or off-state information acquired from these two document length sensors (LS1 and LS2) shall be referred to as document length information.

In order to be able to distinguish the length of many documents in the feed direction, if three or more document length sensors are arranged, the length of the loaded document can be detected in detail from the combination of the on-state or off-state of those document length sensors.

The skew sensor 17 is a sensor for detecting the skew of the document fed in the feed path 12, and corresponds to a document skew detector 126 of FIG. 1.

A plurality of skew sensors 17 are arranged at a predetermined interval on the way of the feed path 12 of the document and in the direction perpendicular to the feed direction of the document.

When the tip end of the document reaches the position of each of the skew sensors 17, each of the skew sensors 17 outputs a detection signal showing that the document has been detected.

The skew sensor 17 is arranged at the beginning of the feed path 12 near immediately after the first feed roller 13, as shown in FIG. 2.

When the document loaded on the document loading table 11 is to be fed, for example, as shown by an arrow in FIG. 2, the loaded document 20 is moved upward and pulled by the first feed roller 13 in the direction of the feed path 12.

If the width of the document guide is set to be substantially the same as the width of the loaded document, the document is pulled into the feed path 12 without any skew and is normally fed along the feed path 12.

However, the document pulled in by the first feed roller may be fed into the feed path 12 in a slightly skewed state.

Then, two skew sensors (SK1 and SK2) 17 are loaded in the feed path 12 near immediately after the first feed roller thereby to detect the skew of the document by using the time difference between the timings of detecting the documents by the two skew sensors.

In FIG. 4, two skew sensors (SK1, SK2) 17 are arranged with a predetermined interval therebetween in the direction perpendicular to the feed direction.

It is preferable that the predetermined interval is a length that is slightly shorter than the width of the document with the smallest document width, among a plurality of documents that can be fed.

Similar to the document length sensor 16, the skew sensor (SK1, SK2) 17 also uses a light detector having a light emitting portion and a light receiving portion, and detects that the tip end of the document has reached the upper part of the skew sensor 17 when the light emitted from the light emitting portion and reflected to the document is detected by the light receiving portion.

Figure 5:
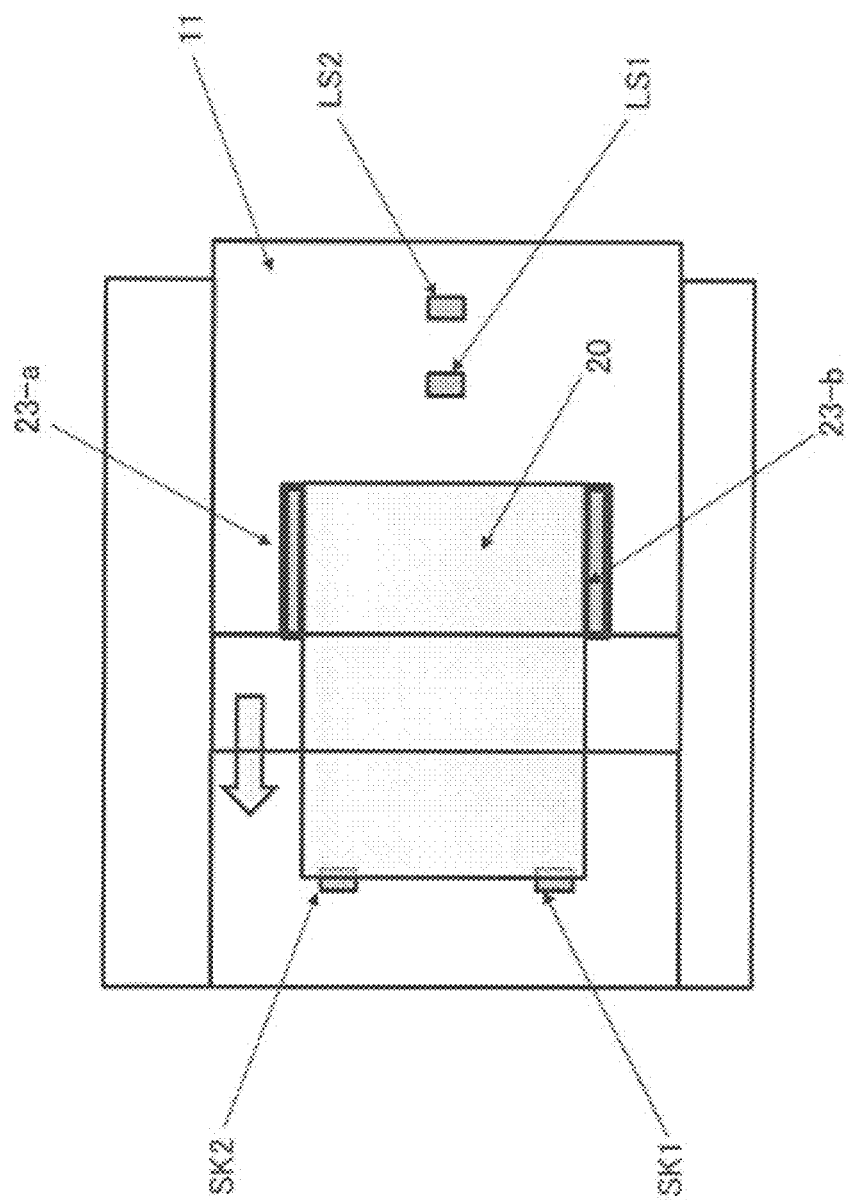
FIG. 5 An illustration of an example of a state where the document loaded on the document loading table of the present invention is normally fed.

FIG. 5 shows an illustration of an example of a state where the document loaded on the document loading table has been normally fed.

As shown in FIG. 5, when the loaded document is normally pulled into the feed path 12 in the left direction of the paper face, the tip ends of the document reach the upper parts of the two skew sensors (SK1 and SK2) 17 at substantially the same time, and there is substantially no time difference between the timings of detecting the document by the two skew sensors.

In this case, it is determined that the document pulled into the feed path 12 is not skewed.

On the other hand, when the document is pulled into the feed path 12 in a slightly skewed state, the tip end of the document first reaches the upper part of either of the two skew sensors (SK1 and SK2) 17, and there is caused a time difference between the timings of detecting the document by the two skew sensors.

Figure 6:
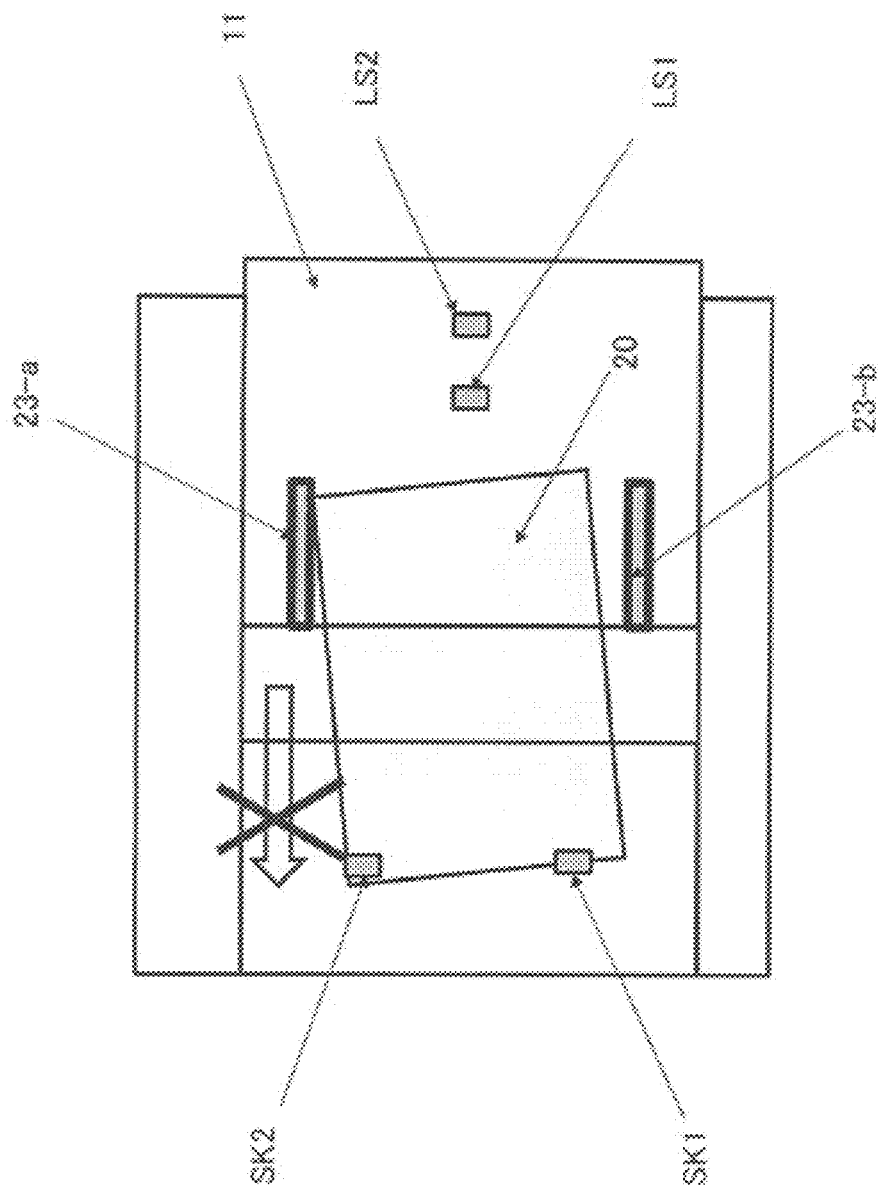
FIG. 6 An illustration of an example of a state where the document loaded on the document loading table of the present invention is fed in a skewed manner.

FIG. 6 shows an illustration of an example of a state where the document loaded on the document loading table is fed in a skewed manner.

As shown in FIG. 6, if the loaded document is slightly skewed downwardly on the paper face when being pulled into the feed path 12 by the first feed roller 13 in the left direction on the paper face, the second skew sensor SK2, which is arranged above the paper face, among the two skew sensors (SK1, SK2) 17, detects that the tip end of the document has reached above the second skew sensor SK2.

Thereafter, with a slight delay, the first skew sensor SK1, which is arranged below the paper face, detects that the tip end of the document has reached above the first skew sensor SK1.

Thus, when there is a time difference between the timings of detecting the documents by the two skew sensors (SK1 and SK2), and the time difference is larger than a predetermined time determination value, the document is determined to have been pulled in a skewed manner.

Alternatively, by means of the feeding speed of the document, the time difference between the timings of detecting the document may be converted into a distance (skew distance), and if the skew distance is larger than a predetermined distance determination value, it may be determined that the document has been skewed and pulled in.

The time difference between the timings of detecting the documents and the skew distance which are detected by the two skew sensors (SK1 and SK2) shall be referred to as a skew shift amount, and the predetermined time determination value and the predetermined distance determination value shall be referred to as a skew shift amount determination value.

The feed sensors (HS1 to HS5) 18 are each installed at a predetermined point in the feed path 12 so as to detect that the document passes through this point.

As the feed sensors (HS1 to HS5) 18, a plurality of sensors are arranged, for example, in the vicinity of each feed roller 13, as shown in FIG. 2.

Like the document length sensor 16, the feed sensor (HS1 to HS5) 18 also uses a photodetector having a light emitting portion and a light receiving portion, and detects that the document has passed when the light emitted from the light emitting portion and reflected to the document is detected by the light receiving portion (when being in the on-state).

The feed sensor (HS1 to HS5) 18 and the feed roller 13 correspond to a document feeder 114 in FIG. 1.

The document detection sensor (GS) 19 is a sensor that detects whether or not the document is loaded on the document loading table, and corresponds to a document loading detector 115 in FIG. 1.

The document detection sensor (GS) 19 is arranged in the vicinity immediately before the entrance of the feed path 12, for example, at the position as shown in FIGS. 2 and 3.

As the document detection sensor (GS) 19, for example, a switch is utilized to detect that the document is loaded on the document loading table when the switch is in an on-state where the switch is pressed down.

In FIG. 1, the automatic document feeder 100 of the one aspect of the present invention mainly includes a controller 111, an operator 112, a display 113, the document feeder 114, the document loading detector 115, the image reader 116, the document length detector 121, a guide width measurer 122, a document width acquirer 123, a guide shift amount calculator 124, a guide shift determiner 125, the document skew detector 126, the skew determiner 127, a warning display information generator 128, and a storage 150.

Herein, as described above, the document feeder 114 corresponds to the feed roller 13 and the feed sensor 18, the document loading detector 115 corresponds to the document detection sensor 19, the document length detector 121 corresponds to the document length sensor 16, and the document skew detector 126 corresponds to the skew sensor 17.

In addition, the document convey control method of the automatic document feeder 100 of the one aspect of the present invention mainly includes processes of detecting, by the document loading detector 115 (document detection sensor 19), that the document is loaded on the document loading table 11, calculating the width between guide members (guide width) by the guide width measurer 122, detects the document length information by the document length detector 121 (document length sensor 16), acquiring, by the document width acquirer 123, the width (document width) of the loaded document by using the calculated guide width and the document length information, etc., then, feeding, to the feed path 12, by the feed roller 13, one by one, one document 20 or a plurality of documents 20 loaded on the document loading table 11, while detecting the skew of the document by the document skew detector 126 (skew sensor 17) and detecting the passage of the document by the feed sensor 18, if the document is normally pulled in without a skew and passes through a predetermined position of the feed path, reading the image of the document that has been fed to the reading site of the reader 21 is read, and then, feeding, in the direction of the discharge port 14, the document that has finished being read, and discharging the document from the discharge port 14 and storing the document on the document discharge table 15.

The controller 111 is a portion that controls the operation of each component such as the operator and the document loading detector, and is mainly realized by a microcomputer including a CPU, a ROM, a RAM, an I/O controller, a timer, and the like.

The CPU organically operates various hardware based on a control program preliminarily stored in ROM or the like, and executes a document loading detection function, a document reading function, and the like of the one aspect of the present invention.

Among the aforementioned components, the guide shift amount calculator 124, the guide shift determiner 125, the skew determiner 127, and the warning display information generator 128 are functional blocks in which the CPU executes respective operations based on a predetermined program.

The operator 112 is an input device for the user of the automatic document feeder 100 to execute a predetermined input operation.

For example, this is the part for inputting information such as characters, inputting the selection of functions, and inputting the meaning of reading start, and a keyboard, a mouse, a touch screen, etc. are used.

The keys operated by the user include an item selection key, an operation start key, and a setting key.

The display 113 is a portion that displays information, and the display 113 displays information necessary for executing each function, a result of execution of the function, etc. in order to notify the user thereof. For example, in a case where an LCD, an organic EL display or the like is used and a touch screen is used as the operator 112, the display 113 and the touch screen are loaded so as to overlap each other.

The display 113 displays, for example, information of setting items such as the size of the to-be-read document, information necessary for executing the document reading function or the like, and an operation screen for the selected function, by using characters, symbols, graphics, images, icons, animations, moving images, and the like.

In the one aspect of the present invention, a warning content of which the user is notified is displayed on the display 113 especially when a feed trouble or the like should occur.

However, when the automatic document feeder 100 is provided in the image forming device, the operator 112 and the display 113 need not be provided, and the operator and the display which are provided in the image forming device may be used.

The document feeder 114 is a portion that, for the reading of the document, feeds the document, which is loaded on the document loading table, to the predetermined feed path, and mainly includes the feed roller 13 and the feed sensor 18.

The feed rollers 13 that feed the document are a pair of rotating members that feeds the document sandwiched therebetween, and as shown in FIG. 2, for example, a plurality of feed rollers 13 is arranged.

The feed sensor 18 is installed at a predetermined plurality of points in the feed path 12, as shown in FIG. 2, and detects that the document passes through each point.

By controlling the operation of the plurality of feed rollers 13, the controller 111 causes the document to be fed along the feed path 12 and to be discharged from the discharge port 14.

The document loading detector 115 is a portion that detects that the document has been loaded on the document loading table 11, and corresponds to the document detection sensor 19 described above.

For example, if a switch is used as the document loading detector 115, it is determined that the document has been loaded when the switch is pressed down when the document is loaded on the document loading table 11.

Alternatively, a photodetector having a light emitting portion and a light receiving portion may be used as the document loading detector 115, similar to the document length sensor 16, and when the light emitted from the light emitting portion and reflected to the document is detected by the light receiving portion, it is detected that the document is loaded on the document loading table.

That is, when the document detection sensor (GS) 19 is in the on-state, it is determined that the document is loaded on the document loading table, and when the document detection sensor (GS) 19 is in the off-state, it is determined that the document is not loaded on the document loading table. When a reading start key is input by the user after the detection that the document has been loaded on the document loading table 11, the reading process of the document is started.

The image reader 116 is a reader 21 that reads an image on the surface of the document that comes to the predetermined reading site, as described above, and uses an image element such as a CCD.

The read image is stored in the storage 150 as image data of the document.

The document length detector 121 corresponds to the document length sensor 16 as described above, and is a portion that detects the length of the loaded document in the feed direction and outputs the document length information that corresponds to the length of the document in the feed direction.

As shown in FIGS. 2 and 3, when the document length sensor 16 includes two document length sensors (LS1 and LS2), the document length is detected by the combination of the on and off-states of the two document length sensors, and is stored as the document length information.

For example, if the first document length sensor LS1 is in the on-state and the second document length sensor LS2 is in the off-state, the information "LS1 is ON and LS2 is OFF" is stored as the document length information.

The guide width measurer 122 is a portion that measures the width of the document guide.

For example, after the document is loaded on the document loading table 11 and the positions of the two guide members are set, the width of the document guide is measured, is calculated as guide width calculation information (GW) 153, and is stored in the storage 150.

As described above, the document guide 23 includes the two guide members (23-*a*, 23-*b*), and after the user loads the document on the document loading table 11, the user moves the two guide members (23-*a*, 23-*b*) thereby to adjust the distance between the guide members (23-*a*, 23-*b*) so as to match the width of the document.

As will be described below, the guide width calculation information (GW) is calculated by using an analog voltage value (analog voltage value Gv described below) that is output corresponding to the distance between the adjusted two guide members (23-*a*, 23-*b*) that have been adjusted.

FIG. 8A shows an illustration of an example of an adjustment position and document guide width about the document guide.

The positions of the two guide members (23-*a*, 23-*b*) shown in solid lines in FIG. 8A is a maximum width GWmax of the document guide, and the positions of the two guide members (23-*a*, 23-*b*) shown in dashed lines in FIG. 8A is a minimum width GWmin of the document guide.

Between the maximum width GWmax and the minimum width GWmin of these document guides, the positions of the two guide members (23-*a*, 23-*b*) are adjusted according to the width of the loaded document.

Once the adjustment positions of the two guide members (23-*a*, 23-*b*) are determined, the analog voltage values corresponding to the adjustment positions are output.

Figure 8B:
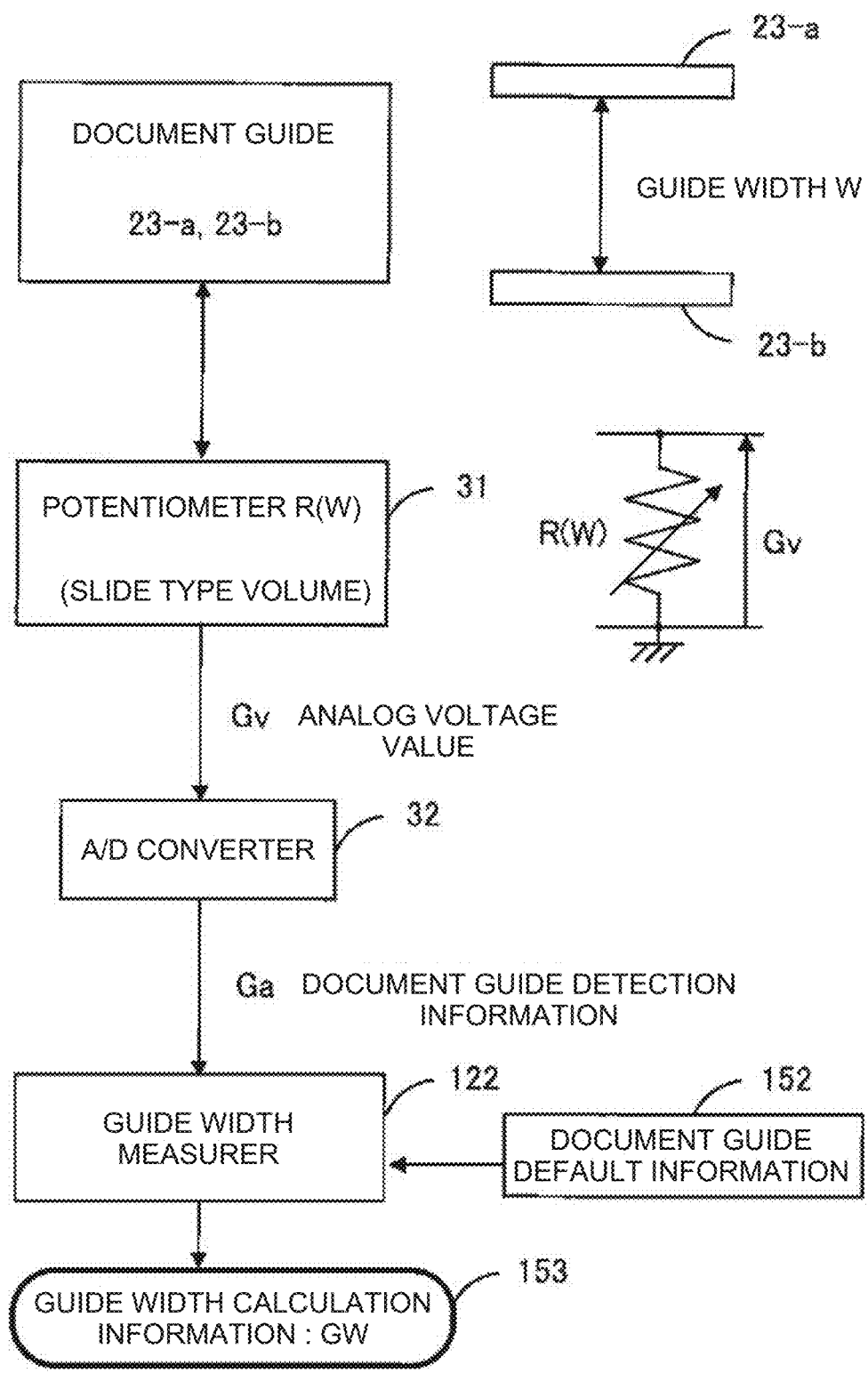
FIG. 8B An illustration of an example of the process of measuring the guide width of the document guide of the present invention.

FIG. 8B shows an illustration of an example of the process of measuring the guide width of the document guide.

In order to adjust the positions of the two guide members (23-*a*, 23-*b*), the two guide members are movably arranged, for example, on a slide rail.

A slide-type potentiometer (slide-type volume) 31 is connected along this slide rail, and a resistance value of the potentiometer 31 changes depending on the adjustment positions of the two guide members.

As shown in FIG. 8B, if the distance (guide width) between the two guide members (23-*a*, 23-*b*) is W, the resistance value R(W) of the potentiometer 31 corresponding to this guide width W is determined, and an analog voltage of the voltage value Gv applied to both ends of the potentiometer 31 is output.

Further, the analog voltage value Gv output from the potentiometer 31 is input to an A/D converter 32.

In the A/D converter 32, the analog voltage value Gv is converted into a digital value and is output as document guide detection information Ga.

The document guide detection information Ga is given to the guide width measurer 122.

The guide width calculation information (GW) is calculated by the guide width measurer 122 by using the document guide detection information Ga and an after-described document guide default information 152.

The guide width calculation information (GW) is used for acquiring a document guide shift amount to be described below.

The document width acquirer 123 is a portion that acquires the document width of the loaded document when the document is loaded on the document loading table.

The acquired width of the document herein is the length of the document in the direction perpendicular to the feed direction of the document, and if the document guide is adjusted to fit the document, the width of the document substantially matches the guide width calculation information (GW).

The to-be-acquired width of the document is referred to as a document width LW.

If the loaded document is a fixed size document, the document width LW of the document is acquired by using the guide width calculation information (GW) 153, the document length information 155, and guide width paper correspondence information 154, as described below.

For example, if the loaded document is an A4 size document and is loaded so that a long side of the A4 size document is parallel to the feed direction, a short side of the A4 size document is acquired as the document width LW. The A4 size document has the long side of 297 mm and the short side of 210 mm, so the document width LW is 210 mm. The document width LW, together with the guide width calculation information (GW), is used to determine the document guide shift amount.

The guide shift amount calculator 124 is a portion that calculates a document guide shift amount GZ, which is a difference between the calculated width of the document guide (guide width calculation information GW) and the acquired width of the loaded document (document width LW).

That is, the document guide shift amount GZ is calculated by a formula: $GZ=GW-LW$.

In order for the loaded document to be normally fed without any feed trouble, the document guide shift amount GZ should be close to zero.

On the other hand, if the document guide shift amount GZ is considerably large, the loaded document may be fed in a skewed manner, which may cause a feed trouble.

The guide shift determiner 125 is a portion that determines, by using the calculated document guide shift amount GZ, whether or not the calculated width of the document guide (guide width calculation information GW) and the acquired width of the document (document width LW) are different from each other to the extent that there may be a feed trouble when the loaded document is fed.

A reference value for determining the guide shift amount is preliminarily stored in the storage 150 as a document guide shift amount determination value GZ0.

This guide shift determination value GZ0 is a numerical value corresponding to a difference between the width of the document guide and the width of the document, which shift may cause the feed trouble.

The guide shift determiner 125 compares the calculated document guide shift amount GZ with the document guide shift amount determination value GZ0, and determines that the loaded document may cause the feed trouble when the document guide shift amount GZ is larger than the document guide shift amount determination value GZ0 (GZ>GZ0).

If GZ>GZ0, for example, the guide width calculation information GW, which is the width of the document guide adjusted by the user, is much larger than the document width LW of the loaded document.

That is, when the document is in a state of feed stop due to the feed trouble of the document, the cause for stop of feeding is likely to be that the width of the document guide was set to be larger than the width of the document.

Then, with the document stopped from being fed, if the guide shift determiner 125 determines that the calculated width of the document guide and the acquired width of the document are different from each other by the predetermined determination value (document guide shift amount determination value GZ0) or more, the warning display information generator 128 displays, on the display 113, a warning display including that the setting of the document guide is different from the width of the document. By checking this warning display, the user can easily know that the cause for stop of feeding may be an inadequate setting of the document guide, and can quickly redo the setting of the document guide that is the cause for stop of feeding.

The case where GZ>GZ0 includes a case where the width of the document guide (guide width calculation information GW) was set to be larger than the width of the document (document width LW) and a case where the width of the document guide (guide width calculation information GW) was set to be smaller than the width of the document (document width LW).

That is, even if the width of the document guide is set smaller than the width of the document and GZ>GZ0 when the document is in a state of feed stop due to the feed trouble of the document, the warning display including the possibility that the cause for stop of feeding is the inadequate setting of the document guide is displayed.

Figure 9B:
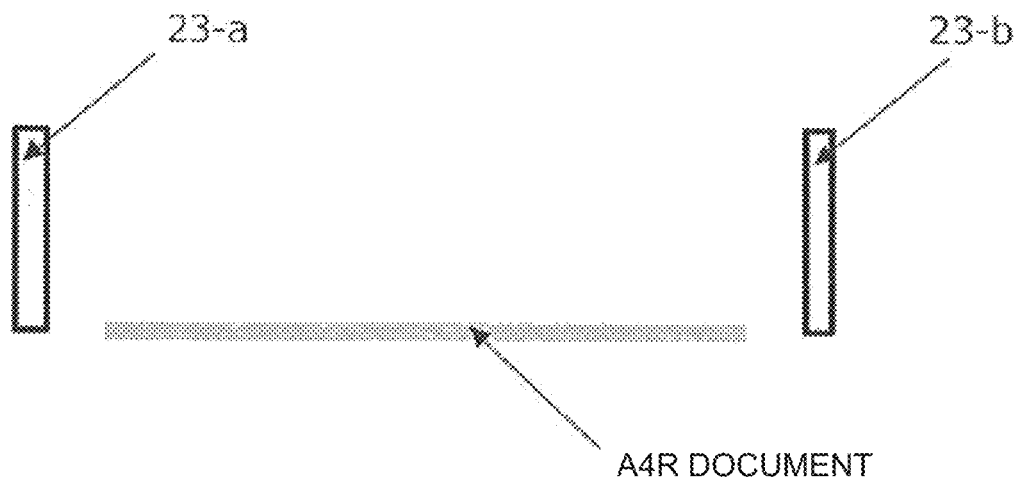
FIG. 9B An illustration of the example of the document loading state seen when the guide width of the document guide of the present invention is wider than the width of the loaded document.
Figure 9C:
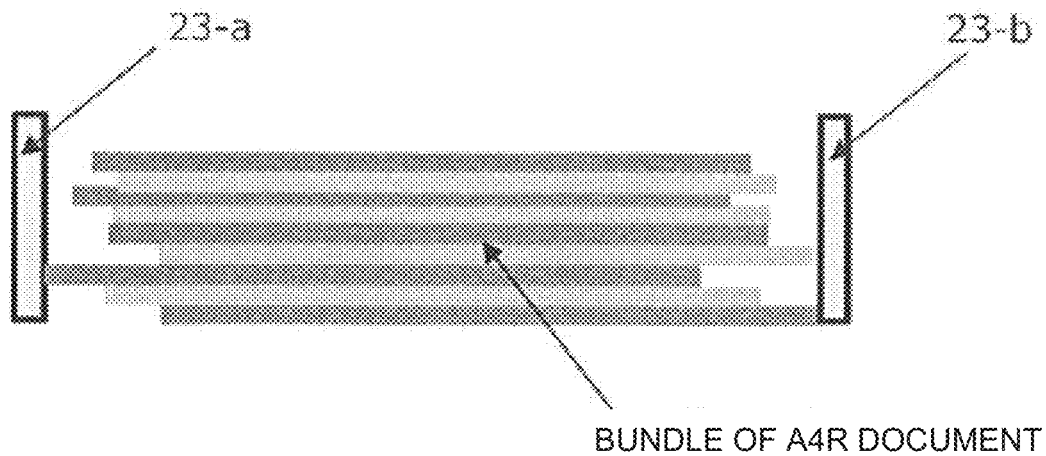
FIG. 9C An illustration of the example of the document loading state seen when the guide width of the document guide of the present invention is wider than the width of the loaded document.

FIG. 9A, FIG. 9B, and FIG. 9C show an illustration of an example of the document loading state that is seen when the guide width of the document guide is wider than the width of the loaded document.

Each of the figures shows the state of an inadequate setting of the document guide.

Herein, the A4 size document (A4R document) is loaded on the document loading table, and the two guide members (23-$a$, 23-$b$) have been adjusted to match the width of the A4R document, but the width of the two guide members (23-$a$, 23-$b$) is wider than the width of the A4R document, causing a gap to between the document guide and the loaded A4R.

The A4R document is a standard A4-size paper, as shown in FIG. 9A, and means the document loaded on the document loading table so that the long side of the standard A4-size paper is parallel to the feed direction.

As shown in FIG. 9B, with the A4R document one in number, the gap caused between the document guide and the A4R document may cause the A4R document to skew when the A4R is pulled into the feed path.

As shown in FIG. 9C, with a plurality of A4R documents, the sides of the bundle of A4R documents may not be aligned, and each A4R document may be pulled into the feed path in a manner to be skewed in various directions.

FIGS. 10A to 10D illustrate an example of the document loading state that is seen when the guide width of the document guide is narrower than the width of the loaded document.

Herein, the A4 size document (A4R document) is loaded on the document loading table, and the two guide members (23-$a$, 23-$b$) have been adjusted to match the width of the A4R document, but because the width of the two guide members (23-$a$, 23-$b$) is narrower than the actual width, of the A4R document, indicated by the dotted lines, the loaded A4R document is curved. Each of the figure shows a state where the document guide setting is inadequate.

Figure 10B:
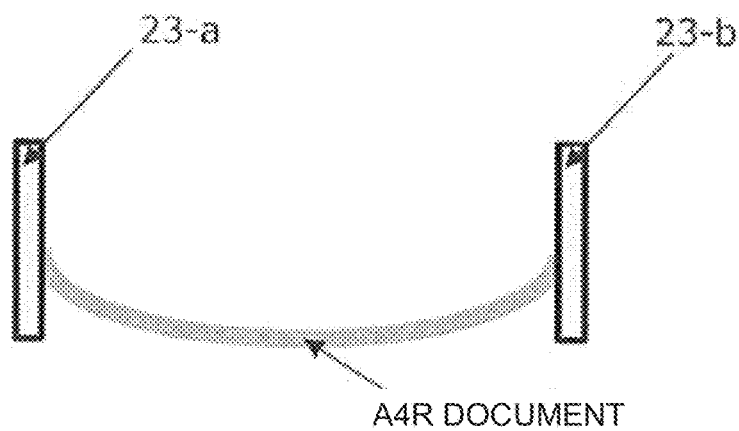
FIG. 10B An illustration of the example of the document loading state seen when the guide width of the document guide of the present invention is narrower than the width of the loaded document.
Figure 10C:
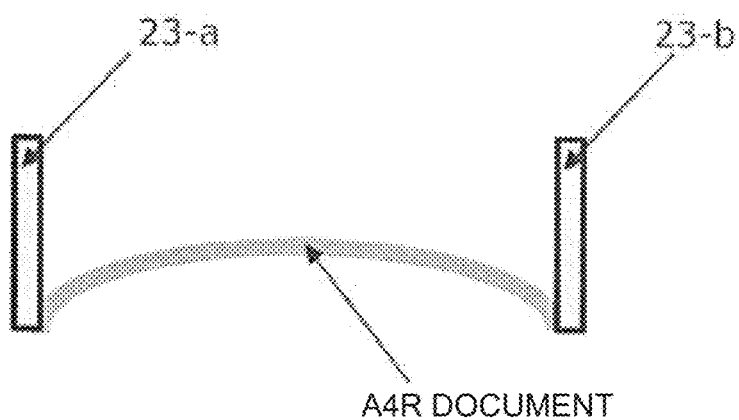
FIG. 10C An illustration of the example of the document loading state seen when the guide width of the document guide of the present invention is narrower than the width of the loaded document.
Figure 10D:
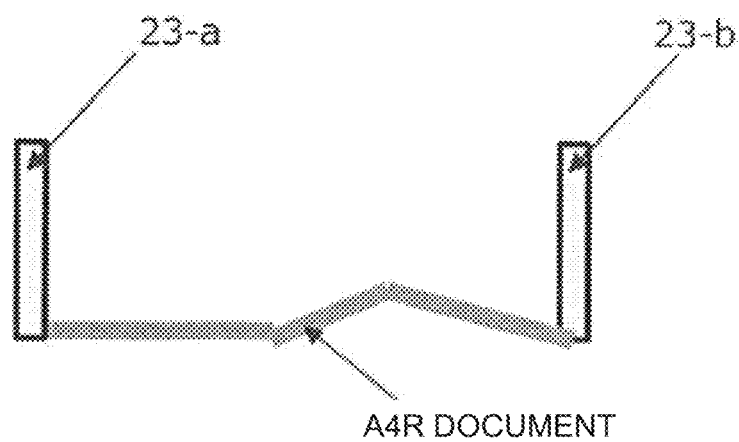
FIG. 10D An illustration of the example of the document loading state seen when the guide width of the document guide of the present invention is narrower than the width of the loaded document.

If the width of the two guide members (23-$a$, 23-$b$) is narrower than the actual width of the A4R document, for example, the A4R document is curved downward or upward as shown in FIG. 10B or FIG. 10C, or the A4R document is loaded in a bent state as shown in FIG. 10D.

If the A4R document is pulled into the feed path in the curved or folded state, the A4R document may be creased, or pulled into the feed path in a skewed manner.

The document skew detector 126 is a portion that detects the skew of the document fed in the feed path 12, and corresponds to the two skew sensors (SK1 and SK2) as described above.

If the document pulled into the feed path 12 is fed with a skew larger than or equal to a predetermined level, a feed trouble that the document is damaged or bent may occur. Then, in the initial stage of pulling the document into the feed path 12, the two skew sensors (SK1 and SK2) detect the skew of the document.

As described above, in a state free from the document, the skew sensor is in the off-state, but when the tip end of the document comes to the position where the skew sensor is arranged, the skew sensor is turned on and the skew sensor outputs an ON signal.

The ON signal output from the skew sensor is given to the controller 111, and the controller 111 stores the time at which the skew sensor changed from the off-state to the on-state.

Figure 7A:
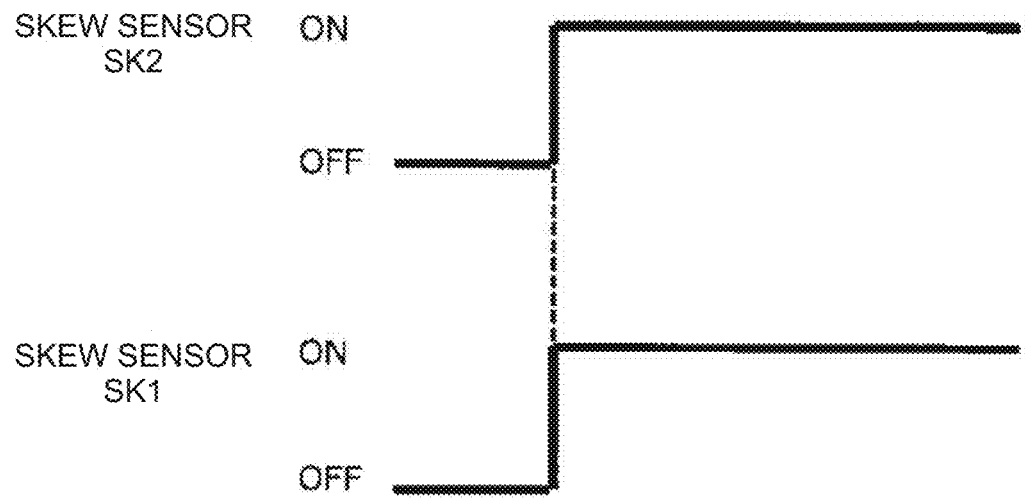
FIG. 7A An illustration of an example of detection timing of a detection signal output from a document skew detector (two skew sensors) of the present invention.
Figure 7B:
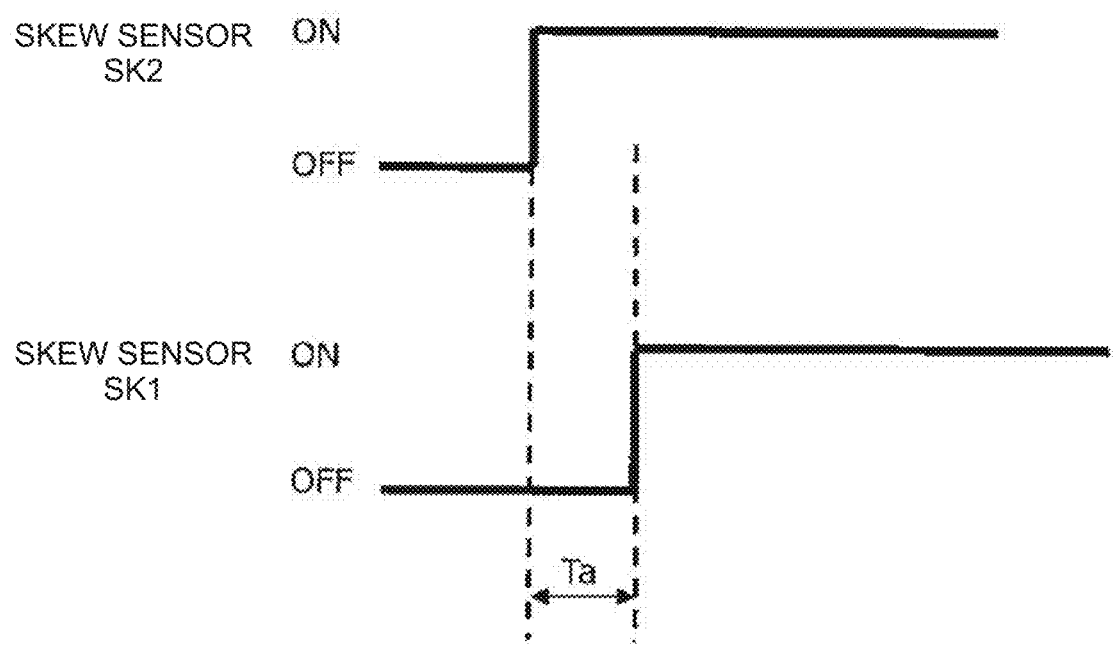
FIG. 7B An illustration of the example of the detection timing of the detection signal output from the document skew detector (two skew sensors) of the present invention.

FIGS. 7A and 7B are illustrative diagrams of an example of the detection timing of the detection signal output from the document skew detector (two skew sensors) 126.

Herein, it is assumed that the detection signal output from the skew sensor includes an ON signal showing the on-state and an OFF signal showing the off-state.

FIG. 7A shows the case where the ON signals are output from the two skew sensors (SK1 and SK2) almost simultaneously.

In this case, as shown in FIG. 5, the tip ends of the document are fed to the positions of the two skew sensors (SK1 and SK2) at substantially the same time, and it can be determined that the document has been normally fed without a skew.

On the other hand, FIG. 7B shows the case where there is caused a time difference between the ON signals output from the two skew sensors (SK1 and SK2).

Herein, it is assumed that the ON signal output from the first skew sensor SK1 is delayed by Ta second(s) from the ON signal output from the second skew sensor SK2.

In this case, as shown in FIG. 6, the tip end of the document is first fed to the position of the second skew sensor SK2, and after a delay of the Ta second(s), the tip end of the document is fed to the position of the first skew sensor SK1, and it can be determined that the document has been fed in a skewed manner.

The skew determiner 127, which will be described below, calculates, as skew shift amount information KT, the time difference of the detection signals (ON signals) output from the respective skew sensors (SK1, SK2), and stores the time difference in the storage 150.

The time difference (Ta second(s)) between these two ON signals is a shift in timing at which the detection signal is changed from the off-state level to the on-state level.

For example, with the time difference of the two ON signals being Ta=25 ms, after an elapse of 25 ms from when the tip end of the document was detected at the position of the second skew sensor SK2, the tip end of the document was detected at the position of the first skew sensor SK1. Therefore, it is determined that the document has been fed with a skew corresponding to the time difference.

Alternatively, the distance shift amount due to the skew (skew distance), which amount is calculated from the time difference of the two ON signals and from the feeding speed of the document, may be stored as the skew shift amount information KT.

For example, if the time difference of the two ON signals is Ta=25 ms and the feeding speed of the document is 300 mm/sec, the distance shift amount due to the skew (skew shift amount information KT) is 300*25/1000=7.5 mm.

In this case, the shift amount of the distance between the tip end of the document detected at the position of the second skew sensor SK2 and the tip end of the document detected at the position of the first skew sensor SK1 is 7.5 mm, and it is determined that the document has been fed with the skew that corresponds to the shift amount of this distance.

The skew determiner 127 is a portion that determines the skew of the document fed in the feed path, and, mainly, when the document is fed in the feed path, determines whether or not the detected skew of the document (skew shift amount information KT) is allowable.

For example, when the above skew shift amount information KT is equal to or larger than the predetermined determination threshold value, the skew determiner 127 determines that the fed document has an unallowable skew.

A skew shift amount determination value KSH, which is the predetermined determination threshold value, is preliminarily stored in the storage 150, and the skew determiner 127 compares the skew shift amount information KT with the skew shift amount determination value KSH.

When KT≥KSH, it is determined that the fed document has the unallowable skew.

When KT≥KSH, the document is stopped because the document may be damaged if the document is continued to be fed any longer.

On the other hand, when KT<KSH, it is determined that there is an allowable skew or there is no skew, and is determined that the fed document has no unallowable skew. When KT<KSH, it is determined that even if the document is skewed, there is no problem in the feeding and reading of the document, and feeding of the document continued and reading of the document is executed.

The warning display information generator 128 is a portion that generates the warning content of which the user is notified.

For example, when the feed trouble of the document occurs, the warning display information generator 128 generates the warning content about the feed trouble.

In addition to the feed trouble, the warning content may also be generated to notify the user when an expected abnormality occurs to the document feeding and reading function, such as document reading trouble.

Further, the warning display information generator 128 causes the display 113 to display the generated warning content.

However, the generated warning content may be reported to the user by voice, or may be sent to a server or the user's own information processing device.

The generated warning content includes a summary of the content of the caused trouble (e.g., document feed error, detection of skewed document feeding, etc.) and the content of the measures that should be taken to solve the trouble (e.g., removal of the document, adjustment of the document guide, etc.).

In the one aspect of the present invention, in particular, when the detected skew of the document is determined by the skew determiner 127 to be unallowable, the document feeder 114 stops feeding the document, the warning display information generator 128 generates the warning content about the feed trouble that has stopped feeding the document, and displays, on the display 113, the generated warning content about the feed trouble.

FIGS. 17 to 22 each show an illustration of an example of a warning display screen of a document feed error displayed on the display of the one aspect of the present invention.

FIG. 17 is a warning display screen that is displayed when the document feed error occurs and feeding is stopped, and is mainly displayed when the cause of the document feed error cannot be specified.

FIG. 17 displays a warning display "Skewed feeding of document is detected. Open document feed cover, and remove paper."

After checking this warning display, the user will open the document feed cover and remove the paper.

On the other hand, if the document feed error occurs and the cause for stop of feeding is related to an inadequate setting of the document guide, a warning display screen including the cause of the document feed error is displayed, as shown in FIGS. 18 to 22.

FIG. 18 to FIG. 22, as in FIG. 17, give a warning display "Skewed feeding of document is detected. Open document feed cover, and remove paper.", and also display the content of measures to be taken regarding the inadequate setting of the document guide, or the like.

For example, in FIG. 18, the cause of the stopped feed is displayed, "It is likely that document guide is shifted, or document is bent or not aligned."

The user who has checked this display will check the shift of the document guide relative to the loaded document and the condition of the fed document.

FIG. 19 displays "The document guide is wider than the detected document size. (Properly adjust document guide to document width)", which shows the cause of the stop of the feeding and the measures to be taken.

Checking this display, the user can check that the document guide is widened, and can adjust the width of the two document guides by narrowing them so that the width of the two document guides becomes substantially the same as the document width.

FIG. 20 displays "Document guide is narrower than detected document size. (Properly adjust document guide to document width)", which shows the cause of the stop of the feeding and the measures to be taken.

Checking this display, the user can check that the document guide is narrowed, and can adjust the width of the two document guides by widening them so that the width of the two document guides becomes substantially the same as the document width.

FIGS. 21 and 22, in addition to the same warning displays as in FIGS. 19 and 20, display the numerical values of the detected size of the document (document width) and the width of the document guide.

According to this, since the size of the document (document width) and the width of the document guide are displayed as numerical values, the user can clearly understand, by comparing these values, that the cause of the document feed error is an inadequate adjustment of the document guide.

In the one aspect of the present invention, if the fed document has the unallowable skew, feeding of the document is stopped and the warning display such as removing the skewed fed document is given.

Further, when the document is stopped, the document guide shift amount GZ is compared with the document guide shift amount determination value GZ0, and if there is a shift of the predetermined value or more between the width of the document guide and the width of the document (GZ>GZ0), the cause for stop of feeding may be an inadequate setting of the document guide, and the warning display including a warning to properly adjust the document guide to the width of the document is displayed.

If the user who checked this warning display correctly readjusts the document guide that may have caused the stop of the document feed, the repeated stops of feeding of document can be reduced when the reading of the document is resumed, and the repeated damages given to the document can also be reduced.

The storage 150 is a portion that stores information and programs necessary for executing each function of the automatic feeder of the one aspect of the present invention, and the storage 150 uses a semiconductor storage device such as ROM, RAM, flash memory, etc., a storage device such as HDD, SSD, etc., and any other storage medium.

The storage 150 stores, for example, document guide detection information 151, the document guide default information 152, the guide width calculation information 153, guide width paper correspondence information 154, document length information 155, document width information 156, document guide shift amount 157, document guide shift amount determination value 158, skew shift amount information 159, skew shift amount determination value information 160, standard paper size information 161, and the like.

FIGS. 11 to 14 each show an illustration of an example of the information stored in the storage.

The document guide detection information 151 is the information Ga corresponding to the width of the document guide (guide width W), as described above, and is information output from the A/D converter 32.

The document guide detection information (Ga) 151 is represented by a digital value that corresponds to the magnitude of the analog voltage value Gv.

For example, as shown in FIG. 14, a numerical value of 350 is stored as the document guide detection information (Ga) 151.

The document guide default information 152 is information that causes the size of the existing standard paper to correspond to the document guide detection information that should be output from the A/D converter 32 when the document guide is adjusted to fit the width of the standard paper.

The document guide default information 152 is preliminarily set and stored for each size of the standard paper.

The document guide default information 152 is used at the time of calculating the guide width calculation information (GW) 153.

FIG. 11 shows an illustration of an example of the document guide default information 152.

In FIG. 11, the document guide default information 152 is shown, in which three pieces of information (G1, G2, and G3) are stored correspondingly.

In FIG. 11, for example, when an existing standard paper such as A4 paper is loaded on the document loading table and the document guide is adjusted so as to substantially match the width of the standard paper, the document guide detection information Ga that should be output from the A/D converter 32 is referred to as a default input value (G3).

The default input value (G3) is also the ideal document guide detection information Ga that should be output from the A/D converter 32 when the document guide is adjusted to match the width of the loaded document.

The default paper size G1 is information that shows the common name of the existing standard paper and the maximum and minimum sizes that can be set for the width between the two guide members of the document guide.

In FIG. 11, as an example, the maximum size, the minimum size, and the common names of the existing standard paper, A4R and A5R, are shown.

The default guide width G2 corresponds to the width of the standard paper (document width) which width is seen when the standard paper of the default paper size is loaded on the document loading table, and is the length of the width (guide width) of the two guide members which width is seen when the document guide is adjusted to substantially match the width of the standard paper (document width).

FIG. 11 shows, for example, that the document width seen when the A4R standard paper is loaded on the document loading table is 210.0 mm, and that the width of the document guide (default guide width) when adjusted to match this document width is 210.0 mm.

Similarly, the document width seen when the A5R standard paper is loaded on the document loading table is 148.0 mm, and the width of the document guide (default guide width) seen when adjusted to match this document width is 148.0 mm.

Also shown is that the maximum size width that can be set for the width between the two guide members (default guide width) is 303.0 mm.

The default input value G3 is the document guide detection information Ga that should be output from the A/D converter 32 when the two guide members are adjusted to match the default guide width G2.

The default input value G3 shown in FIG. 11 is a representative value corresponding to the default guide width G2. However, a numerical range including a minimum input value and a maximum input value may be preliminarily set and stored as the default input value G3, in view of an error in the document guide detection information Ga to be output.

For example, when the A4R standard paper is loaded on the document loading table, the default guide width G2 is 210.0 mm, whereas the default input value G3 caused to correspond to the A4R standard paper shows that the document guide detection information Ga that should be output from the A/D converter 32 when the width of the document guide (guide width) is adjusted to be 210.0 mm is 380.

Similarly, when the A5R standard paper is loaded on the document loading table, the default guide width G2 is 148.0 mm, whereas the default input value G3 caused to correspond to the A5R standard paper shows that the document guide detection information Ga that should be output from the A/D converter 32 when the width of the document guide (guide width) is adjusted to be 148.0 mm is 619.

The default guide width G2, which is the width of the maximum size that can be set for the width between the two guide members, is 303.0 mm, whereas the default input value G3 caused to correspond to this maximum size shows that the document guide detection information Ga that should be output from the A/D converter 32 when the width of the document guide (guide width) is adjusted to be 303.0 mm is 45.

If, when the document guide is actually adjusted, the width of the document guide (guide width) substantially matches the width of the loaded document, the document guide detection information Ga output from the A/D converter 32 substantially matches the default input value G3 that corresponds to the loaded document.

On the other hand, if, when the document guide is actually adjusted, the width of the document guide (guide width) is different from the width of the loaded document, the document guide detection information Ga output from the A/D converter 32 differs from the default input value G3 that corresponds to the loaded document.

The guide width calculation information 153 is information that corresponds to the calculated width of the document guide (guide width), when the document guide is adjusted by the user and the positions of the two guide members are determined.

The guide width calculation information (GW) 153 is calculated by using the document guide detection information (Ga) 151 and the document guide default information 152.

FIG. 14 shows an illustration of an example of a method of calculating the guide width calculation information (GW) 153.

Herein described is a case where the user has loaded the A4R document paper on the document loading table and has set the positions of the two guide members.

The A4R document paper is A4 size standard paper, and loading the A4R document paper on the document loading table means that the document paper is loaded so that the long side of the A4 size standard paper is parallel to the feed direction.

In this case, the positions of the two guide members are set so that the short side of the A4 size standard paper is the document width, and that the width of the document guide (guide width) substantially matches the short side of the A4 size standard paper.

The short side of A4R document paper is 210 mm, and the long side of A4R document paper is 297 mm.

In FIG. 14, it is assumed that when the positions of the two guide members are determined, the acquired document guide detection information Ga is 350.

The document guide default information 152 in FIG. 14 shows information about the maximum size and the A4R that are a part of the document guide default information 152 shown in FIG. 11.

The default guide width of the largest size (303.0 mm) is G20, and the default input value of the largest size (45) is G30.

The default guide width of the A4R document (210.0 mm) is G21, and the default input value of the A4R document (380) is G31.

That is, in this example, the numerical values of respective variables are Ga=350, G20=303, G21=210, G30=45, and G31=380.

As shown in FIG. 14, the acquired document guide detection information Ga (=350) is between the two default input values (G30 and G31) shown in the document guide default information 152 in FIG. 14 (G30<Ga<G31).

In this case, the guide width calculation information GW, which corresponds to the width of the document guide (guide width), is calculated by using the following formula shown in FIG. 14.

$$GW = G21 + ((Ga - G31)/(G30 - G31)) \times (G20 - G21)$$

By substituting the numerical value of each of the above variables into this formula, the guide width calculation information GW becomes 218.32 mm.

This calculates that the distance (guide width) between the two guide members set by the user is 218.32 mm.

However, since the short side of the A4R document paper is 210 mm and the width (document width) of the loaded A4R document paper is 210 mm, causing a difference from the calculated distance between the two guide members (guide width).

That is, the distance between the two guide members (guide width) set by the user is 218.32 mm, while the width of the loaded A4R document paper (document width) is 210 mm, so the guide width is about 8 mm wider than the document width.

This means that the distance (guide width) between the two guide members set by the user is considerably different from the width of the loaded document paper (document width), and that the user did not exactly match the two guide members to the loaded A4R document paper.

In the case of the example shown in FIG. 14, the document guide shift amount GZ, which is the difference between the guide width and the document width, is 8 mm, and if the preset document guide shift amount determination value GZ0 is 4 mm, because of GZ>GZ0, it is determined that the distance (guide width) between the two guide members is so wide that there is a possibility of a feed trouble.

The guide width paper correspondence information 154 is information that preliminarily sets and stores a correspondence between the width of the document guide (guide width) and the to-be-loaded document paper.

Although it is difficult for the width of the document guide set by the user (guide width) to be always set to be the same as the width of the to-be-loaded document paper, if the guide width calculation information GW calculated as shown in FIG. 14 is known, the size of the loaded document paper can be predicted, and if the loaded document paper is the standard paper, the standard paper type can be predicted.

The guide width paper correspondence information 154 is used for acquiring the paper type of and the width information of the loaded document.

As described above, the length of the loaded document paper in the feed direction can be predicted from the information (document length information) that combines the current states (on or off) of the two document length sensors (LS1 and LS2), and if the loaded document paper is the standard paper, the standard paper type can be predicted. Then, in the guide width paper correspondence information 154, the type of the document paper is preliminarily set and stored, for example, in a manner to be cause to correspond to a tolerance of the guide width to which the guide width calculation information GW belongs and corresponds to the document length information.

The width of the loaded document (document width) can be specified by using the guide width paper correspondence information 154 which causes the tolerance of the guide width to which the guide width calculation information GW belongs, the document length information, and the type of the document paper to correspond to each other and preliminarily stores the above.

In the one aspect of the present invention, the document width acquirer 123 uses the guide width paper correspondence information 154 to specify the tolerance of the width of the document guide to which the calculated guide width calculation information GW belongs, determines the type of the document paper that corresponds to the specified tolerance of the width of the document guide and corresponds to the document length information output by the document length detector 121, and acquires, as the document width of the loaded document, the document width preliminarily set for the determined type of the document paper.

FIG. 12 shows an illustration of an example of the guide width paper correspondence information 154.

The guide width paper correspondence information 154 shown in FIG. 12 is information that presets the type of document paper that corresponds to the tolerance of the guide width to which the guide width calculation information GW belongs and to the document length information.

Herein shown as the type of the document paper include those storing a standard paper type, such as A4 size.

The tolerance of the guide width is a numerical range that sets the upper and lower limits of the width of the document guide, and that is a preset range of the width of the document guide that would be set when the document guide is adjusted to fit the loaded document.

In FIG. 12, five guide width tolerances are shown as examples, but the present invention is not limited to these tolerances.

As shown in FIG. 12, several standard paper types are preset corresponding to the guide width tolerance.

For example, if, with the standard paper being loaded, A4 size and A3 size sheets of standard paper are available as standard paper for which the width of the document guide may be set to 288.0 mm or more, the A4 size and A3 size sheets of standard paper are preset corresponding to the column in which the guide width tolerance is "288.0 mm or more".

With this, if the calculated guide width calculation information GW belongs to the guide width tolerance of "288.0 mm or more", it means that the loaded document paper may be the A4 size standard paper or the A3 size standard paper.

Further, for example, if, with the standard paper being loaded, A5 size, A4R size, and legal-size sheets of standard paper are available as standard paper for which the width of the document guide may be set to 196.0 mm or more and 235.9 mm or less, A5 size, A4R size, and legal-size sheets of standard paper are preset corresponding to the column in which the guide width tolerance is "196.0 mm or more and 235.9 mm or less".

With this, if the calculated guide width calculation information GW belongs to the guide width tolerance of "196.0 mm or more and 235.9 mm or less", it means that the loaded document paper may be any of the A5 size, A4R size, and legal-size sheets of standard paper.

The document length information is a combination of the states of the output from the two document length sensors (LS1 and LS2), and three combinations of information are shown in FIG. 12.

Corresponding to these three combination information, several types of standard paper are preset as the to-be-loaded document.

From the combination of the states of output from the two document length sensors (LS1 and LS2), the length of the loaded document in the feed direction can be predicted, and several types of standard paper can be set.

The three combination information-states are LS1=OFF and LS2=OFF, LS1=ON and LS2=OFF, and LS1=ON and LS2=ON.

However, as shown in FIG. 3, with the two document length sensors (LS1 and LS2) being arranged, when the second document length sensor LS2 is ON, the first document length sensor LS1 is also always ON, and the states of LS1=OFF and LS2=ON are not possible.

For example, when LS1=OFF and LS2=OFF with the document being loaded, this corresponds to a case where the standard paper with a relatively short length of the loaded document in the feed direction is loaded, and the candidate of the loaded document may be any of the following types of standard paper: A4, Letter, B5, A5, and B5R.

For example, when LS1=ON and LS2=OFF with the document being loaded, this corresponds to a case where the standard paper with a relatively long length of the loaded document in the feed direction is loaded, and the candidate of the loaded document may be any of the following sheets of standard paper: A3, ledger, B4, A4R, and B5R.

However, in FIG. 12, the standard paper type specified corresponding to both of the combination of the states of output from the document length sensors (LS1 and LS2) and the aforementioned guide width tolerance are preset.

Once the combination of the states of output from the document length sensors (LS1 and LS2) and the guide width tolerance to which the calculated guide width calculation information GW belongs are determined, the guide width paper correspondence information 154 shown in FIG. 12 determines the standard paper type of the currently loaded document.

As the standard paper size information shown in FIG. 13, the size (width and length) of each standard paper is predetermined according to the standard paper type, so once the type of the loaded standard paper is determined, the width of the loaded document (document width) can be acquired.

For example, if the calculated guide width calculation information GW is 250 mm and the combination of the states of output from the document length sensors (LS1 and LS2) is LS1=OFF and LS2=OFF, the GW belongs to the guide width tolerance of "236.0 mm or more and 267.9 mm or less", and therefore the guide width paper correspondence information 154 of FIG. 12 determines that the standard paper type of the currently loaded document is B5.

If the standard paper type of the loaded document is B5, the width of the loaded document (document width) is 257 mm, referring to FIG. 13.

Further, for example, if the calculated guide width calculation information GW is 218.32 mm and the combination of the states of output from the document length sensors (LS1 and LS2) is LS1=ON and LS2=OFF, since the GW belongs to the guide width tolerance of "196.0 mm or more and 235.9 mm or less", the guide width paper correspondence information 154 in FIG. 12 determines that the standard paper type of the currently loaded document is A4R.

If the standard paper type of the loaded document is A4R, the width of the loaded document (document width) is 210 mm.

The document length information 155 is information which is output from the document length sensor that corresponds to the above-described document length detector 121, and which shows whether the current document length sensor is in an on-state (ON) or an off-state (OFF). As shown in FIG. 3, when the document length sensor includes two sensors (LS1 and LS2), the combination of the current states (on-state or off-state) of the two document length sensors (LS1 and LS2) is stored as the document length information 155.

For example, when the document is loaded as shown in FIG. 4, it is stored, as the document length information 155, that the first document length sensor LS1 in the on-state (ON) and the second document length sensor LS2 in the off-state (OFF).

The document length information 155 is used for acquiring the document width information of the loaded document.

The document width information 156 is a length (document width) in the direction perpendicular to the feed direction of the loaded document.

As described above, once the standard paper type of the loaded document is determined, the document width information (LW) 156 can be acquired by using the standard paper size information shown in FIG. 13.

That is, by using the guide width calculation information (GW) 153 and the document length information 155, which are information acquired when the document is loaded, and the guide width paper correspondence information 154 which is preliminarily set and stored, the standard paper type of the loaded document and the document width information (LW) 156 are acquired.

For example, as described above, if it is determined that the standard paper type of the loaded document is B5, the document width information (LW) 156 is 257 mm.

If it is determined that the standard paper type of the loaded document is A4R, the document width information (LW) 156 is 210 mm.

Further, the amount of difference between the width of the document guide and the width of the loaded document (document guide shift amount) is calculated from the difference between the guide width calculation information GW and the document width information LW.

The document guide shift amount 157 is the amount of difference between the width of the document guide set by the user (guide width) and the width of the loaded document (document width).

The document guide shift amount (GZ) 157 is calculated from the difference between the guide width calculation information GW, which is the calculated width between the two guide members (guide width), and the above acquired document width information LW (GZ=GW−LW).

For example, if the guide width calculation information GW is 218.32 mm and the standard paper type of the loaded document is A4R and the document width information LW thereof is 210 mm, the document guide shift amount (GZ) 157 is GW−LW=8.32 mm.

The document guide shift amount (GZ) 157 is used to determine the shift of the document guide relative to the loaded document.

The document guide shift amount determination value 158 is a reference value (GZ0) that is used to determine the shift of the document guide relative to the loaded document, and is preliminarily stored in the storage 150.

The document guide shift amount GZ calculated as above is compared with the document guide shift amount determination value GZ0, thereby to determine the shift of the document guide relative to the document width of the loaded document.

For example, if the document guide shift amount GZ is larger than the document guide shift amount determination value GZ0, it is determined that the shift of the document guide relative to the document width of the loaded document is large, causing a possibility of the feed trouble of the document.

In this case, for example, the warning display screen displays that the width of the set document guide is widened and that the document guide needs to be properly adjusted to the document width.

Although a specific numerical value may be fixedly preliminarily set and stored as the document guide shift amount determination value GZ0, the administrator or user of the device may be able to change the document guide shift amount determination value GZ0 as necessary in view of the usage conditions of the device, or the like.

The skew shift amount information 159 is the information KT corresponding to the skew of the document detected by the document skew detector 126.

As described above, the skew shift amount information 159 may be the time difference Ta of the ON signals of the two skew sensors (SK1 and SK2), and the distance shift amount (skew distance) due to the skew of the document may be stored.

If the fed document is not skewed, there will be almost no shift in the detection timings of the ON signals output from the two skew sensors (SK1 and SK2).

However, if the fed document is skewed, there will be a shift in the detection timings of the ON signals output from the two skew sensors (SK1 and SK2).

If the shift in the detection timings of the ON signal is very small, possibility of a trouble in the subsequent feed is small, but if the shift in the detection timings is so large that the shift cannot be ignored, a trouble in the subsequent feeding and reading may be possible.

Therefore, as described above, comparing the skew shift amount information 159 with the skew shift amount determination value 160, the skew determiner 127 determines whether or not the skew of the fed document is allowable.

The skew shift amount determination value 160 is a determination threshold value KSH that serves as a standard to determine whether the skew of the document is allowable or not, and is preliminarily set and stored by a person in charge of management or the like.

If the skew shift amount information 159 is the time difference Ta of the ON signals, the skew shift amount determination value KSH is also a time value, and if the skew shift amount information 159 is the distance shift amount, the skew shift amount determination value KSH is also a distance value.

As described above, if the skew shift amount information KT is larger than or equal to the skew shift amount determination value KSH (KT≥KSH), it is determined that there is an unallowable skew, and the document is stopped from being fed.

The standard paper size information 161 is information that preliminarily sets and stores the size of the standard paper.

FIG. 13 shows an illustration of an example of the size of the standard paper used for the read document (standard paper size information 161).

Since the width and length are predetermined for standard paper such as A4 size, it is sufficient to preliminarily store the width and length, as shown in FIG. 13, about the standard paper that can be used for the automatic document feeder.

In addition to the standard paper shown in FIG. 13, when using any non-standard size paper or any unique size paper, the width and length of the indefinite size paper may be preliminarily set and stored.

Further, when the non-standard size paper is used, any information corresponding to the non-standard size paper is to be preliminarily stored in the document guide default information 152 and the guide width paper correspondence information 154.

In this way, by preliminarily storing the information on the non-standard size paper in the document guide default information 152, the guide width paper correspondence information 154, and the standard paper size information 161, it is possible to determine the shift amount of the document guide not only for the standard paper but also for the non-standard size paper loaded on the paper.

In addition, since the shift amount of the document guide can be determined when the non-standard size paper is loaded, displaying the warning display including the fact that there is shift of the document guide relative to the loaded non-standard size paper allows the user to take appropriate measures if the cause of the feed trouble is the shift amount of the document guide.

Description of an Example of Document Guide Shift Detecting Method of the Present Invention With the aforementioned structures and functions, the automatic document feeder of the one aspect of the present invention detects the shift of the document guide relative to the loaded document when feeding the document loaded on the document loading table.

A document guide shift detecting method of the automatic document feeder includes, for example, the following steps.

Document Loading Detecting Step

After the document is loaded on the document loading table and the position of the document guide including two guide members for aligning the document from the direction orthogonal to the feed direction of the document loaded on the document loading table is set, it is detected that the document has been loaded on the document loading table.

Guide Width Measuring Step

The width of the document guide is measured, and is calculated as the guide width calculation information.

Document Width Acquiring Step

The document width of the document loaded on the document loading table is acquired.

Guide Shift Determining Step

It is determined whether or not the calculated guide width calculation information and the acquired document width are different from each other to such an extent that a feed trouble may be caused when the loaded document is fed.

Document Skew Detecting Step

After the document loaded on the document loading table for reading of the document is started to be fed to the predetermined feed path, the skew of the document fed to the feed path is detected.

Skew Determining Step

It is determined whether or not the detected skew of the document is allowable.

Feed Stopping Step

If the detected skew of the document is determined to be unallowable, the document is stopped from being fed.

Warning Information Generating Step

The warning content about the feed trouble that stopped the feeding of the document is generated.

Warning Displaying Step

The generated warning content about the feed trouble is displayed.

If it is determined that the calculated width of the document guide and the acquired width of the document are different from each other by the predetermined determination value or more, the displayed warning content includes the fact that the setting of the document guide is different from the width of the document.

Description of One Aspect of the Document Reading Process

Herein, after the user loads one document or a plurality of documents on the document loading table and adjusts the position of the document guide, and further when the user inputs a request to start reading, all the loaded documents are sequentially fed and the document is read one by one.

Hereinafter described is an example of a case where, if the skew shift of the document is detected while the document is being fed, and if the amount of the shift is considerably large, the feeding of the document is stopped, and if the user's adjusted position of the document guide is considerably different relative to the loaded document, it is determined that the cause of the skew of the document is the adjusted position of the document guide, and a warning is displayed to the user, including the fact that the setting of the document guide is inadequate.

Figure 15:
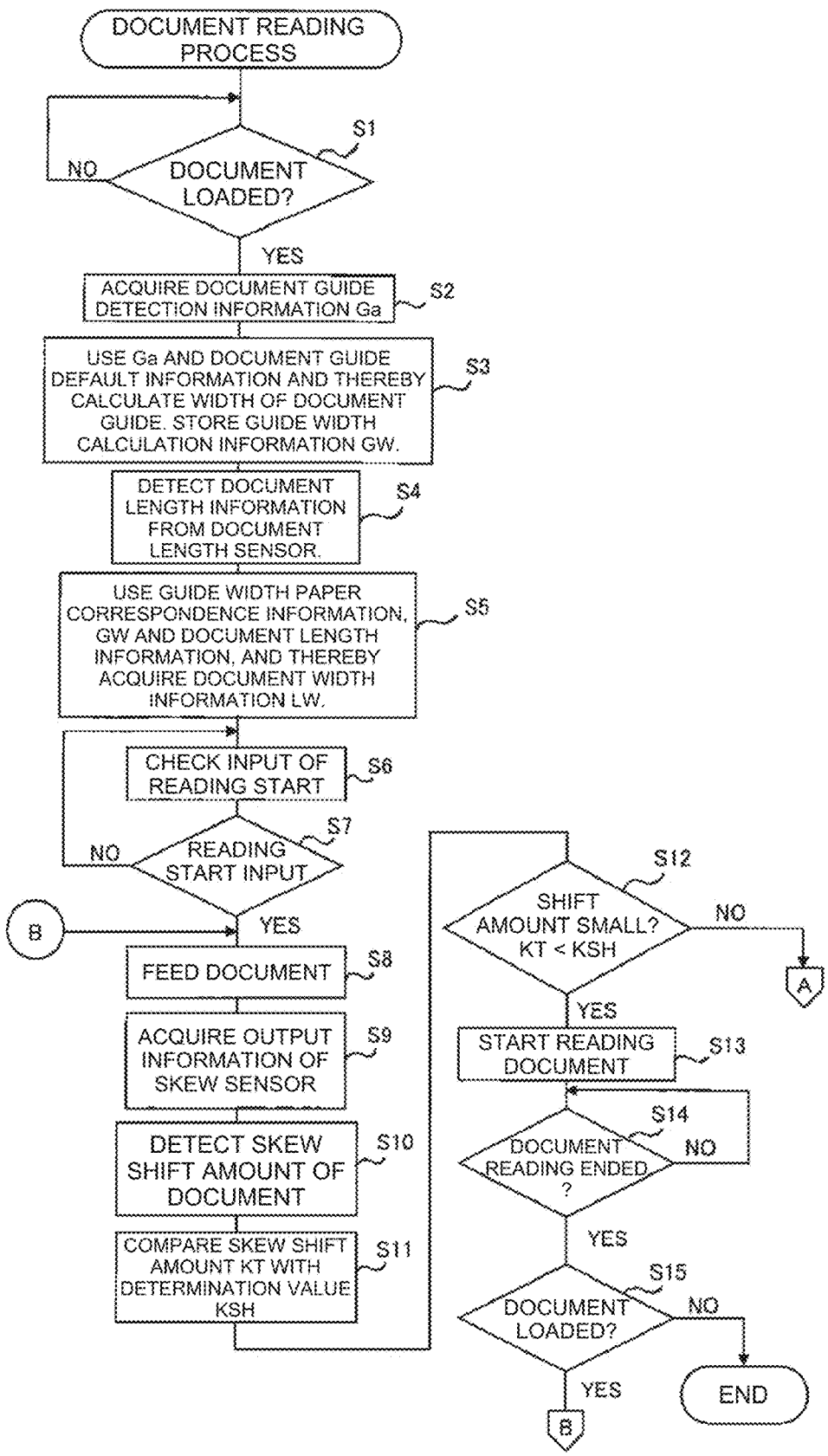
FIG. 15 A flowchart of an example of a document reading process of the present invention.
Figure 16:
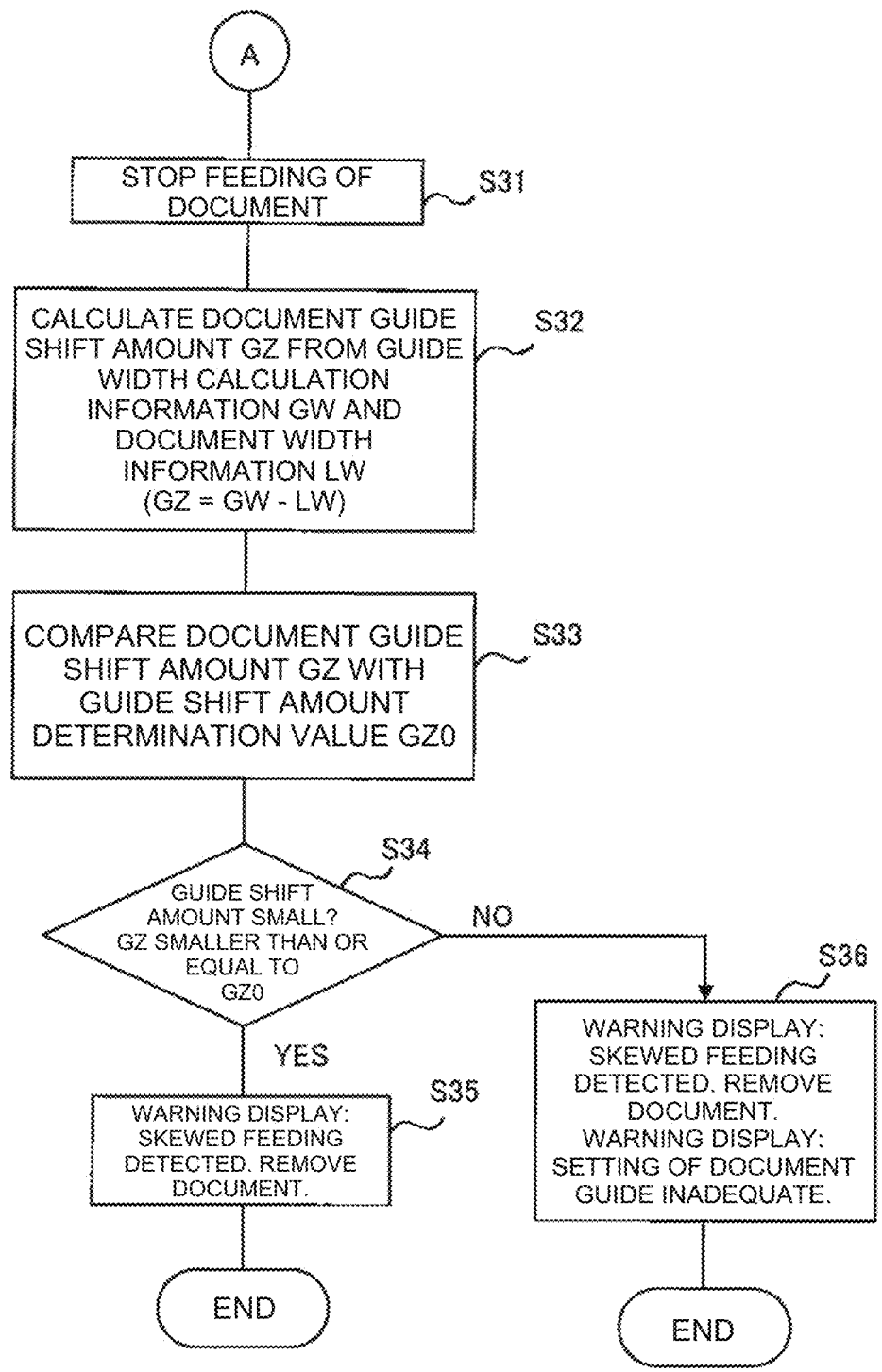
FIG. 16 A flowchart of the example of the document reading process of the present invention.

FIG. 15 and FIG. 16 each show a flowchart of one aspect of the document reading process of the present invention. In step S1 of FIG. 15, the document loading detector 115 checks whether the document is loaded on the document loading table, and if the document is loaded, the process proceeds to step S2, otherwise, repeats step S1.

In step S2, the guide width measurer 122 acquires the document guide detection information Ga. As described above, the analog voltage value Gv applied to the potentiometer 31 and output from the potentiometer 31 is converted by the A/D converter 32 into the digital value, and is acquired and stored as the document guide detection information Ga.

In step S3, the guide width measurer 122 calculates the guide width calculation information GW.

Herein, as described above, using the document guide detection information Ga and the document guide default information 152, the guide width calculation information GW is calculated and stored by the calculation as shown in FIG. 14.

In step S4, the document length information 155, which is the information output from the document length sensors (LS1 and LS2) as the document length detector 121, is detected and stored.

As described above, the document length information 155 is information showing the current on-state or off-state of the two document length sensors (LS1 and LS2).

In step S5, the document width acquirer 123 acquires the document width information LW.

As described above, the document width information LW is acquired by using the guide width paper correspondence information 154, the guide width calculation information GW, and the document length information 155.

In step S6, it is checked whether an input operation, which means the start of reading, has been performed by the user. In step S7, if it is detected that the input meaning the start of reading has been made, the process proceeds to step S8, otherwise, repeats step S6.

In step S8, the document feeder 114 starts feeding the document.

Herein, in the case of a plurality of loaded documents, the documents are pulled into the feed path 12 one by one.

In step S9, output information of the skew sensors (SK1, SK2), which are the document skew detector 126, is acquired.

In step S10, the output information of the skew sensors (SK1 and SK2) is used thereby to detect the skew shift amount KT of the document.

As described above, the time difference between the ON signals, which are output from the skew sensors (SK1 and SK2) when the skew sensors (SK1 and SK2) are changed to the on-state, is stored as the skew shift amount KT.

In step S11, comparing the skew shift amount KT with the skew shift amount determination value KSH determines whether or not the skew of the document is allowable.

In step S12, if the skew shift amount KT is less than the skew shift amount determination value KSH (KT<KSH), the process proceeds to step S13, otherwise, proceeds to step S31 of FIG. 16.

In step S13, reading of the document is started by the reader 21 which is the image reader 116.

Herein, since the skew of the document is allowable, the feeding of the document is continued, the information described in the document is read, and the information is stored as image data.

In step S14, if the reading of one document is completed, the process proceeds to step S15, otherwise, repeats step S14.

In step S15, the process checks whether or not there still remains a document on the document loading table 11. If there still remains a document, the process returns to step S8 thereby to feed the next document.

If there remains no document on the document loading table 11, the process is ended.

In step S31 of FIG. 16, since the skew shift amount KT is larger than the skew shift amount determination value KSH, and if the document is continued to be fed, a feed trouble may occur, the document feeding is stopped. This causes the document to stop in the middle of the feed path 12.

In step S32, the guide shift amount calculator 124 calculates the document guide shift amount GZ.

As described above, the document guide shift amount GZ is calculated from the guide width calculation information GW and the document width information LW using the formula: GZ=GW−LW.

In step S33, the guide shift determiner 125 compares the document guide shift amount GZ with the document guide shift amount determination value GZ0.

In step S34, if the document guide shift amount GZ is less than or equal to the document guide shift amount determination value GZ0 (GZ≤GZ0), the process proceeds to step S35, otherwise, proceeds to step S36.

In step S35, the warning display is displayed on the display 113 showing that a skewed feeding of the document has been detected and that the document is to be removed. In the case of GZ≤GZ0, the difference between the guide width and the width of the loaded document is small, so it is highly possible that the cause for stopping the document feeding is not the setting of the document guide, and any other cause is conceivable.

Then, the warning display such as the one shown in FIG. 17 and not showing the cause for stopping the feeding of the document.

In step S36, the warning display is displayed on the display 113 showing a sentence meaning that a skewed feeding of the document has been detected and that the document is to be removed, as well as a sentence meaning that the setting of the document guide is inadequate. When GZ>GZ0, the difference between the guide width and the width of the loaded document is large, so the cause for stopping the document feeding is likely to be the setting of the document guide.

Then, there is displayed the warning display that includes the fact that the cause for stopping the document feeding is a difference between the width of the set document guide and the width of the loaded document and that the document guide should be set.

As mentioned above, for example, the warning displays shown in FIG. 18 to FIG. 22 are made.

The user who sees this warning display can easily check that the cause of the stop of the document feeding is the document guide, and thereby can properly remove the cause of the stop of the document feeding by taking measures to properly adjust the width of the document guide to the width of the document.

Other Example

In the above example, it has been described that after the stop of feeding the document, if the cause for stop of feeding the document is the inadequate setting of the document guide, the warning display screen makes the display including that the setting of the document guide should be redone or the like.

However, in the case of the document guide having the inadequate setting, after an instruction is input for the start of reading the document and before the feeding of the document is started, a warning display including that the setting of the document guide must be redone may be made. By displaying this warning display before the start of feeding the document, the user can be caused to redo the setting of the document guide, thereby preventing any trouble in feeding the document.

What is claimed is:

1. An automatic document feeder, comprising:
   a document loading detector that detects that a document is loaded on a document loading table;
   a document feeder that feeds, to a predetermined feed path, the document loaded on the document loading table;
   a document guide that includes two guide members for aligning the document from a direction orthogonal to a feed direction of the document loaded on the document loading table;
   a guide width measuring circuitry that, after the document is loaded on the document loading table and positions of the two guide members are set, measures a width of the document guide and calculates the width as guide width calculation information;
   a document width acquiring circuitry that acquires a document width of the loaded document when the document is loaded on the document loading table;
   a guide shift determining circuitry that determines whether or not the calculated guide width calculation information and the acquired document width are different from each other to such an extent that the difference may cause a feed trouble when the loaded document is fed;
   a document skew detector that detects a skew of the document fed in the predetermined feed path;
   a skew determining circuitry that determines whether or not the detected skew of the document is allowable or not;
   a warning display information generating circuitry that generates a warning content about the feed trouble when the feed trouble occurs; and
   a display that displays the generated warning content, wherein
   when the detected skew of the document is determined to be unallowable, the document feeder stops the feeding of the document, and the guide shift determining circuitry determines whether or not the calculated guide width calculation information of the document guide and the acquired document width of the document are different from each other by a predetermined determination value or more, and
   when the calculated guide width calculation information of the document guide and the acquired document width of the document are determined to be different from each other by the predetermined determination value or more, the warning display information generating circuitry displays on the display a warning display including that a skewed feeding of the document has been detected, and that a setting of the document guide is different from the document width.

2. The automatic document feeder according to claim 1, further comprising:
   a storage that stores guide width paper correspondence information, and
   a document length detector that detects a length of the loaded document in the feed direction, and outputs document length information that corresponds to the length of the document in the feed direction, wherein in the guide width paper correspondence information, a type of document paper is preliminarily stored, in a manner to correspond to a tolerance of the width of the document guide to which the guide width calculation information belongs and correspond to the document length information, and the document width acquiring circuitry uses the guide width paper correspondence information to specify the tolerance of the width of the document guide to which the calculated guide width calculation information belongs, determines the type of the document paper that corresponds to the specified tolerance of the width of the document guide and corresponds to the document length information output by the document length detector, and acquires, as the document width of the loaded document, the document width preliminarily set for the determined type of the document paper.

3. The automatic document feeder as claimed in claim 1, wherein the document skew detector includes a plurality of skew sensors arranged at a predetermined interval in a direction perpendicular to the feed direction of the document in a middle of the predetermined feed path of the document, and each of the skew sensors outputs a detection signal showing that the document is detected when a tip end of the document reaches a position of the skew sensor.

4. The automatic document feeder as claimed in claim 3, wherein the skew determining circuitry calculates, as skew shift amount information, a time difference of the detection signals output from the respective skew sensors, and determines, when the skew shift amount information is equal to or larger than a predetermined determination threshold value, that the fed document has an unallowable skew.

5. The automatic document feeder as claimed in claim 2, wherein the document length detector includes a plurality of document length sensors which are, in the document loading table, arranged at a position separated by a predetermined distance along the feed direction of the document.

6. The automatic document feeder as claimed in claim 2, further comprising a guide shift amount calculating circuitry that calculates, as a document guide shift amount, a difference between the calculated guide width calculation information and the acquired width of the loaded document, wherein the storage preliminarily stores a document guide shift amount determination value that is a standard value for determining the document guide shift amount, and when the calculated document guide shift amount is larger than the document guide shift amount determination value, the guide shift determining circuitry determines that the loaded document may cause the feed trouble.

7. A method for detecting a shift of a document guide of an automatic document feeder, the method comprising:

detecting, after a document is loaded on a document loading table, and a position of the document guide including two guide members for aligning the document from a direction orthogonal to a feed direction of the document loaded on the document loading table is set, that the document is loaded on the document loading table;

measuring a width of the document guide and calculating the width as guide width calculation information;

acquiring a document width of the document loaded on the document loading table;

determining whether or not the calculated guide width calculation information and the acquired document width are different from each other to such an extent that the difference may cause a feed trouble when the loaded document is fed;

detecting a skew of the document, which is fed in a predetermined feed path, after the document loaded on the document loading table is, for reading of the document, started to be fed to the predetermined feed path;

determining whether or not the detected skew of the document is allowable or not;

stopping the feeding of the document when the detected skew of the document is determined to be unallowable;

generating a warning content about the feed trouble that stopped the feeding of the document;

displaying the generated warning content about the feed trouble; and when the detected skew of the document is determined to be unallowable, determining whether or not the calculated guide width calculation information of the document guide and the acquired document width of the document are different from each other by a predetermined determination value or more, wherein when it is determined that the calculated guide width calculation information of the document guide and the acquired document width of the document are different from each other by the predetermined determination value or more, the displayed warning content includes that a skewed feeding of the document has been detected, and that a setting of the document guide is different from the document width.

* * * * *